June 23, 1931. M. SCHWARTZ Re. 18,113

MULTIOFFICE AUTOMATIC TELEPHONE SYSTEM

Original Filed Feb. 8, 1924 8 Sheets-Sheet 1

Inventor
Michael Schwartz

Chas. M. Candy. Atty.

June 23, 1931. M. SCHWARTZ Re. 18,113

MULTIOFFICE AUTOMATIC TELEPHONE SYSTEM

Original Filed Feb. 8, 1924 8 Sheets-Sheet 2

Inventor
Michael Schwartz
Chas. M. Caudy Atty.

June 23, 1931. M. SCHWARTZ Re. 18,113

MULTIOFFICE AUTOMATIC TELEPHONE SYSTEM

Original Filed Feb. 8, 1924 8 Sheets-Sheet 3

Inventor
Michael Schwartz

Chas. M. Candy, Atty.

June 23, 1931. M. SCHWARTZ Re. 18,113

MULTIOFFICE AUTOMATIC TELEPHONE SYSTEM

Original Filed Feb. 8, 1924 8 Sheets-Sheet 4

Inventor
Michael Schwartz
Chas. M. Candy. Atty.

June 23, 1931. M. SCHWARTZ Re. 18,113

MULTIOFFICE AUTOMATIC TELEPHONE SYSTEM

Original Filed Feb. 8, 1924 8 Sheets-Sheet 5

Inventor
Michael Schwartz
Chas. M. Caudy. Atty.

June 23, 1931. M. SCHWARTZ Re. 18,113

MULTIOFFICE AUTOMATIC TELEPHONE SYSTEM

Original Filed Feb. 8, 1924 8 Sheets-Sheet 6

Inventor
Michael Schwartz
Chas. M. Caudy. Atty.

June 23, 1931. M. SCHWARTZ Re. 18,113

MULTIOFFICE AUTOMATIC TELEPHONE SYSTEM

Original Filed Feb. 8, 1924 8 Sheets-Sheet 7

Inventor
Michael Schwartz
Chas. M. Candy. Atty:

June 23, 1931. M. SCHWARTZ Re. 18,113

MULTIOFFICE AUTOMATIC TELEPHONE SYSTEM

Original Filed Feb. 8, 1924 8 Sheets-Sheet 8

Inventor
Michael Schwartz
Chas. M. Caudy. Atty.

Reissued June 23, 1931

Re. 18,113

UNITED STATES PATENT OFFICE

MICHAEL SCHWARTZ, OF CHICAGO, ILLINOIS, ASSIGNOR, BY MESNE ASSIGNMENTS, TO AUTOMATIC ELECTRIC INC., OF CHICAGO, ILLINOIS, A CORPORATION OF DELAWARE

MULTIOFFICE AUTOMATIC TELEPHONE SYSTEM

Original application filed February 8, 1924, Serial No. 691,327. Renewed October 24, 1927. Original No. 1,674,134, dated June 19, 1928. Application for reissue filed June 18, 1930. Serial No. 462,115.

The present invention relates to multioffice automatic telephone systems in general, but is concerned more particularly with systems of the above character in which call directors are employed to register, translate, and retransmit the part of the number which is indicative of the office called, and the broad general object, briefly stated, may be said to consist in the provision of new and improved circuit arrangements whereby the subscriber digits (the part of a number indicative of the desired line in the particular office called) of a telephone number may be translated also and in such a manner that the capacity of a given train of automatic step by step switches may be increased so as to accommodate a larger number of subscribers without increasing the number of switches in the train.

There are many other objects, several of which are more or less incidental to the carrying out of the main object, all of which will be best understood from a further perusal of the specification.

Referring now to the drawings comprising Figs. 1–12, inclusive, Figs. 1–4, inclusive, show four trunking layouts which are to be used in explaining the objects and features of the invention, while Figs. 5–11, inclusive, show a sufficient amount of apparatus employed in a telephone system embodying the principles of the invention to enable the invention to be understood and its utility appreciated, and Fig. 12 shows how Figs. 5–11, inclusive, should be placed together.

Referring now to Figs. 1–4, inclusive, Fig. 1 is a representative layout of a 10,000-line office employing the standard ten-level selectors. Only five levels, however, of the thousands selectors are used and the capacity of the office, which accordingly would otherwise be only 5,000 lines is brought back to 10,000 lines by the use of 200-line connectors.

Figure 1:
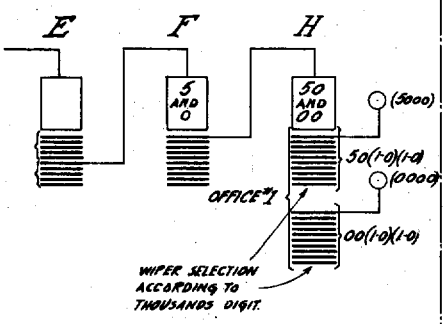

Referring now more particularly to Fig. 1, the first five levels of the thousands selector E are used to trunk calls to five groups of hundreds selectors, one of which is represented by the hundreds selector F. The ten levels of the hundreds selector F are used to trunk to ten groups of 200-line connectors, of which one group is represented by the 200-line connector H.

Regarding the necessary translation in the telephone numbers, which of course are listed in the directory and called according to the decimal system, it may be pointed out that in case the thousands digit is anything from 1 to 5, inclusive, it is not translated, but if the thousands digit is anything from 6 to 0, inclusive, five is subtracted from it, or in other words, the digits 6 to 0, inclusive, are combined with the digits 1 to 5, inclusive.

At this time it may be pointed out, that, since only five levels of the selector E are used to trunk calls to 10,000 lines, each of the five following groups of switches handles more calls than if ten levels of the selector E were used to handle the same number of calls. In this way, a considerable saving in the total number of switches can be made owing to the increased trunking efficiency that is made possible whenever two relatively small groups can be combined into one larger group.

Regarding the translation necessary in order to choose between the two wipers of the connector H, it may be pointed out that the set of banks on the connector H that are used depends upon the thousands digit. If this digit is anything from 1–5, inclusive, the upper set of banks of the connector H is used, while if this digit is anything from 6–0, inclusive, an artificial series of eleven impulses is sent to the connector H after the vertical movement and before the regular numerical rotary movement, resulting in the wipers of the connector H which cooperate with the upper bank being rotated entirely over the bank of contacts, and resulting in the wipers of the lower bank (which are set at such an angle that they are not brought into operative relation with the associated bank contacts unless the eleven preliminary rotary steps are taken by the switch shaft) being brought into position ready to be rotated over the bank as soon as the next and last series of impulses is delivered.

In summing up the layout of Fig. 1, it may be pointed out that ten separate groups of numbers are combined into five composite groups, represented by the first five levels of the thousands selector, and are later separated automatically on the banks of the 200-line connectors.

Figure 2:
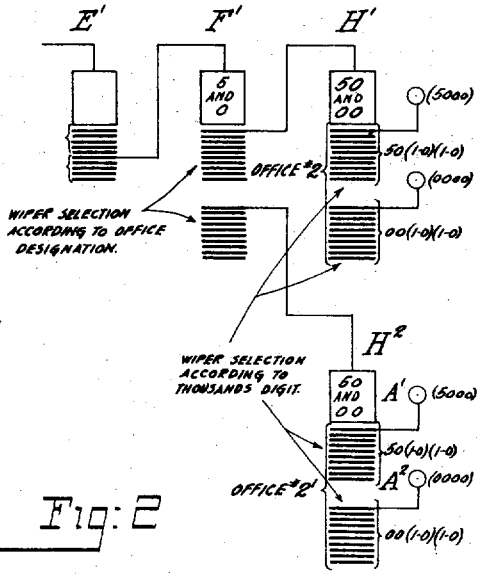
Fig. 2 shows a layout of two 10,000 line offices in which the same thousands and hundreds selectors are used for both offices; in which 200-line connectors are used, as in Fig. 1; and in which the hundreds selectors are of the twenty-group type instead of the ten-group type shown in Fig. 1.

Referring now particularly to Fig. 2, it may be pointed out that this trunking layout is different from that shown in Fig. 1, only in that the hundreds selector F′ is of the twenty-group type. This selector has two sets of wipers and a preliminary wiper-selecting digit must be delivered to it ahead of the regular series of impulses which operates it to select a trunk, the circuit arrangements being such that if office No. 2 is called the wiper-selecting digit is 2 and the upper bank is used, while if office No. 2′ is called, the wiper-selecting digit is 3 and the lower bank of selector F is used.

Figure 3:
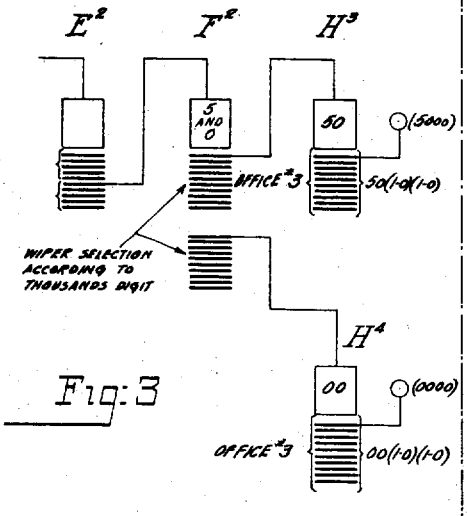
Fig. 3 is a layout of a 10,000-line office and is somewhat similar to Fig. 1, except that twenty-group hundreds selectors are used instead of the 200-line connectors shown in Fig. 1.

Referring now particularly to Fig. 3, it may be pointed out that the thousands digits 6–0, inclusive, when this office is called, are combined with the thousands digits 1–5, inclusive, respectively, in the manner pointed out above in connection with Fig. 1. In the layout shown in Fig. 3, however, the thousands digit controls the sending out of the wiper selecting digit to the hundreds selectors, such as the selector $F^2$, instead of controlling the sending out of a preliminary wiper-selecting series of eleven impulses to pick out connector wipers as in the case of Fig. 1. It is thus seen that the scheme shown in Fig. 1, and the scheme shown in Fig. 3 are simply two different methods of obtaining the same result as regards the capacity of the switch train, and it may be pointed out that the traffic conditions may be such in one office as to make the use of one layout expedient, while the traffic conditions in another office of the same system may be such that the use of the other layout is more economical, or it may even happen that two smaller telephone systems, originally owned and operated by different interests, are later consolidated into one large system, in which case both layouts might then appear in the same large system, although it was originally intended to use only one of these layouts in any given system.

Figure 4:
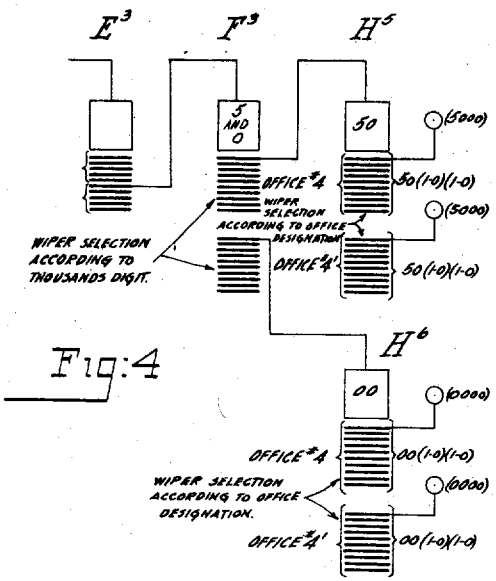
Fig. 4 is a layout similar to Fig. 3, except that the capacity of the connectors shown in Fig. 3 has been increased to 200 lines and the second or lower half of the connector banks is used to accommodate a second 10,000 line office.

Referring now particularly to Fig. 4, it may be pointed out that this layout takes care of 20,000 lines and differs from the layout shown in Fig. 3 only in that the connectors, such as $H^5$, are of the 200-line type instead of the 100-line type. In this latter case, one bank of any one connector, such as $H^5$ for example, represents lines in one office, while the other bank of the same connector represents lines in a different office. Accordingly the sending out of the preliminary series of eleven impulses between the vertical movement and the regular rotary movement of the connectors is controlled according to which of the two offices is called.

It may be pointed out at this time that the capacity of any one of the four trains of switches shown in Figs. 1–4, inclusive, may be doubled. When this is done, the traffic to the hundreds selectors and connectors shown is handled in the same way as described hereinbefore and, in addition, the upper five levels of the thousands selectors, instead of being left dead, are used to trunk calls through a new group of hundreds selectors and thence by way of the connectors to the called lines. After this is done, when a number is called which must be reached by way of one of the upper five levels of a thousands selector, the thousands digit is sent out untranslated in case it is any digit from 6 to 0, inclusive, but translated in case it is any digit from 1 to 5, inclusive, the translation being such that the thousands digit 1 becomes a 6; the thousands digit 2 becomes a 7; etc. Accordingly, when either of the layouts shown in Figs. 2 and 4 is used for both halves of the thousands selector banks, four 10,000-line offices located in the same building may be accommodated with one set of thousand selectors and with only three local switches involved in any one connection.

Figure 5:
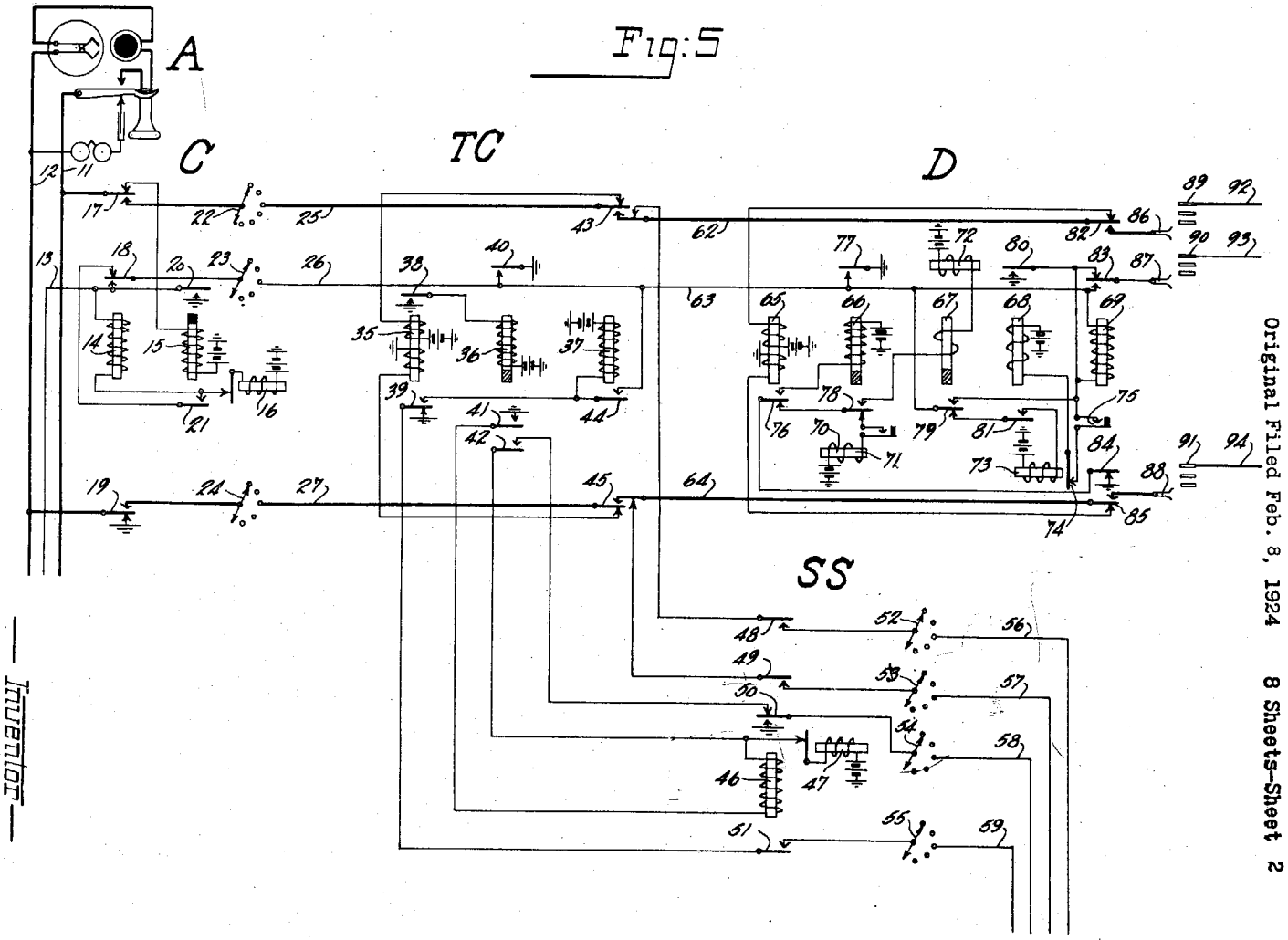
Figure 6:
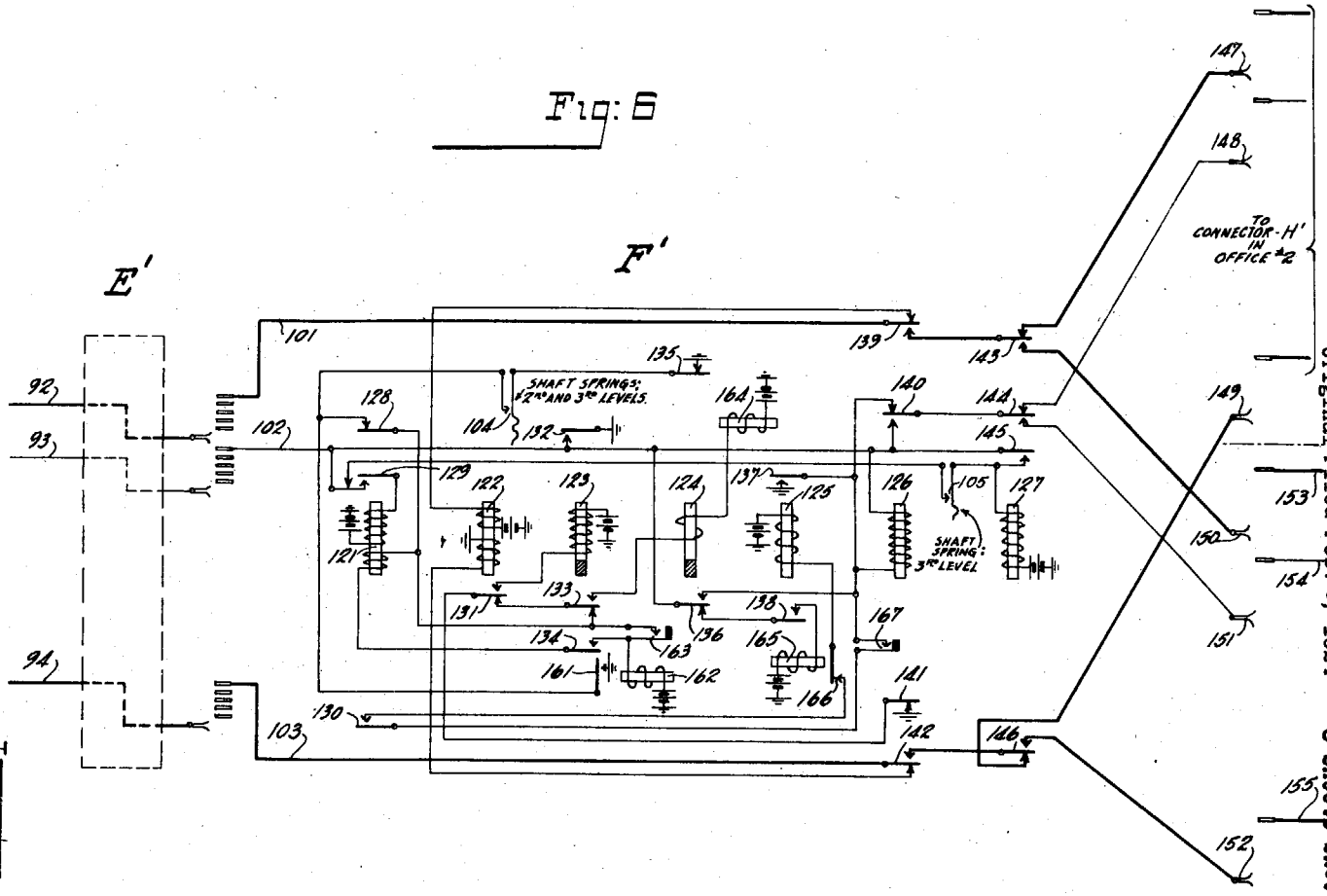
Figure 7:
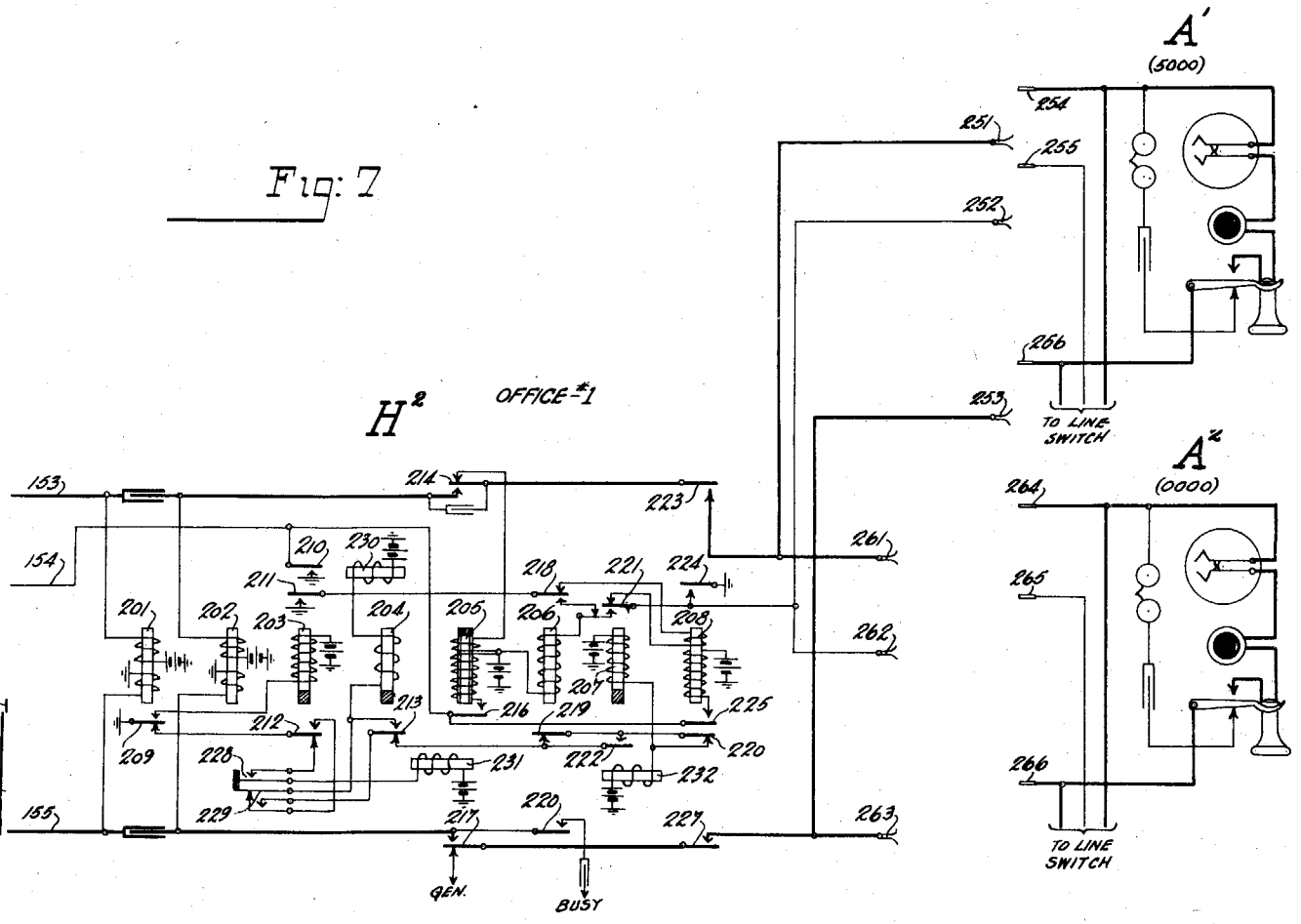

Referring now to Figs. 5–11, inclusive, Figs. 5, 6, and 7 show the switching equipment employed for a connection from the line of substation A, Fig. 5, to either of the two substations, A′ or $A^2$, Fig. 7, which substations are also represented in Fig. 2 as accessible to the connector $H^2$; and Figs. 8–11, inclusive, show by means of the usual circuit diagrams one of the call directors employed in making the necessary translation both in the office digits and the subscriber digits of the numbers.

Fig. 5 shows the line switch C in which the line of substation A terminates and also the trunk circuit TC, which is one of the trunk circuits accessible to the line switch C. This trunk circuit is individual to the selector D and has associated with it the secondary switch SS which selects an idle director when the trunk circuit TC is taken for use.

Fig. 6 shows the thousands selector E′ which is denoted in this drawing by means of the dotted rectangle bearing that reference character. The selector E′ is accessible to the selector D, Fig. 5, and has access to second selectors of which the selector F′ is one. The trunking may be readily appreciated by referring back to Fig. 2.

Fig. 7 shows the 200 line connector $H^2$ whose upper wipers 251–253, inclusive, are used to complete the connection when the eleven preliminary rotary steps are not taken by the switch shaft. The lower set of wipers 261–263, inclusive, are used to complete the connection in case the eleven preliminary rotary steps are taken. The fact that the lower wipers are set at an angle with the banks is indicated diagrammatically in the drawings.

Figure 8:
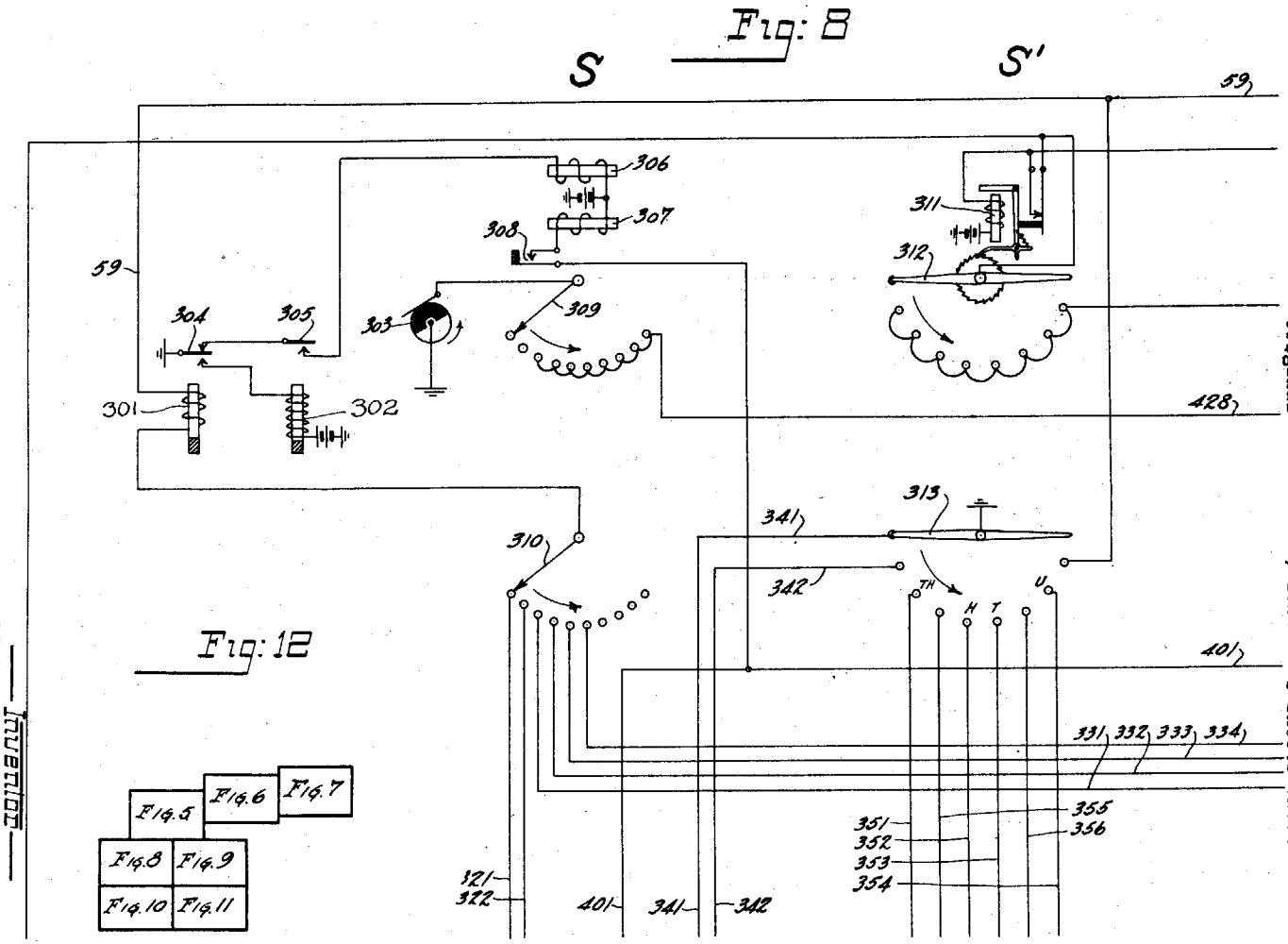
Figure 9:
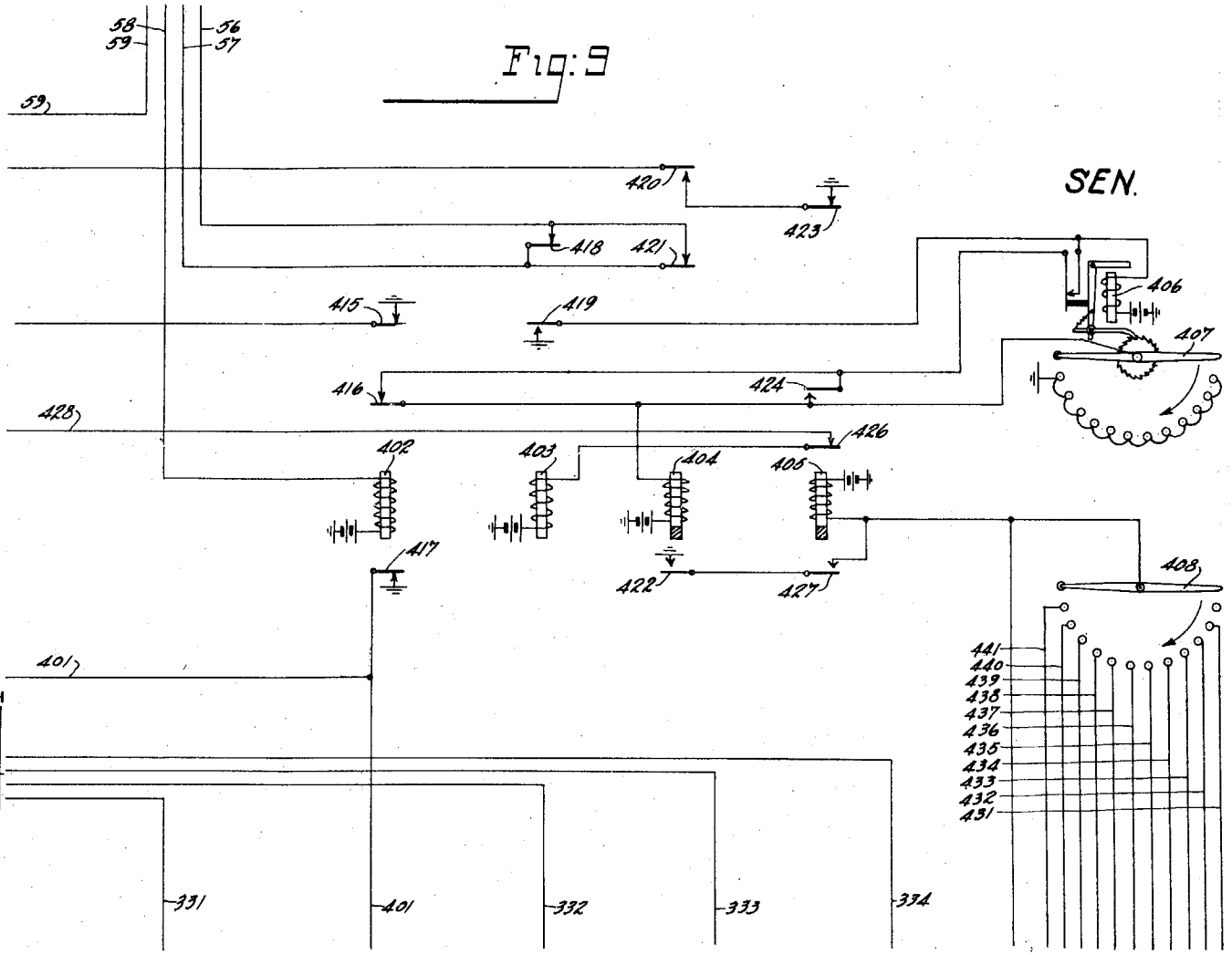
Figure 10:
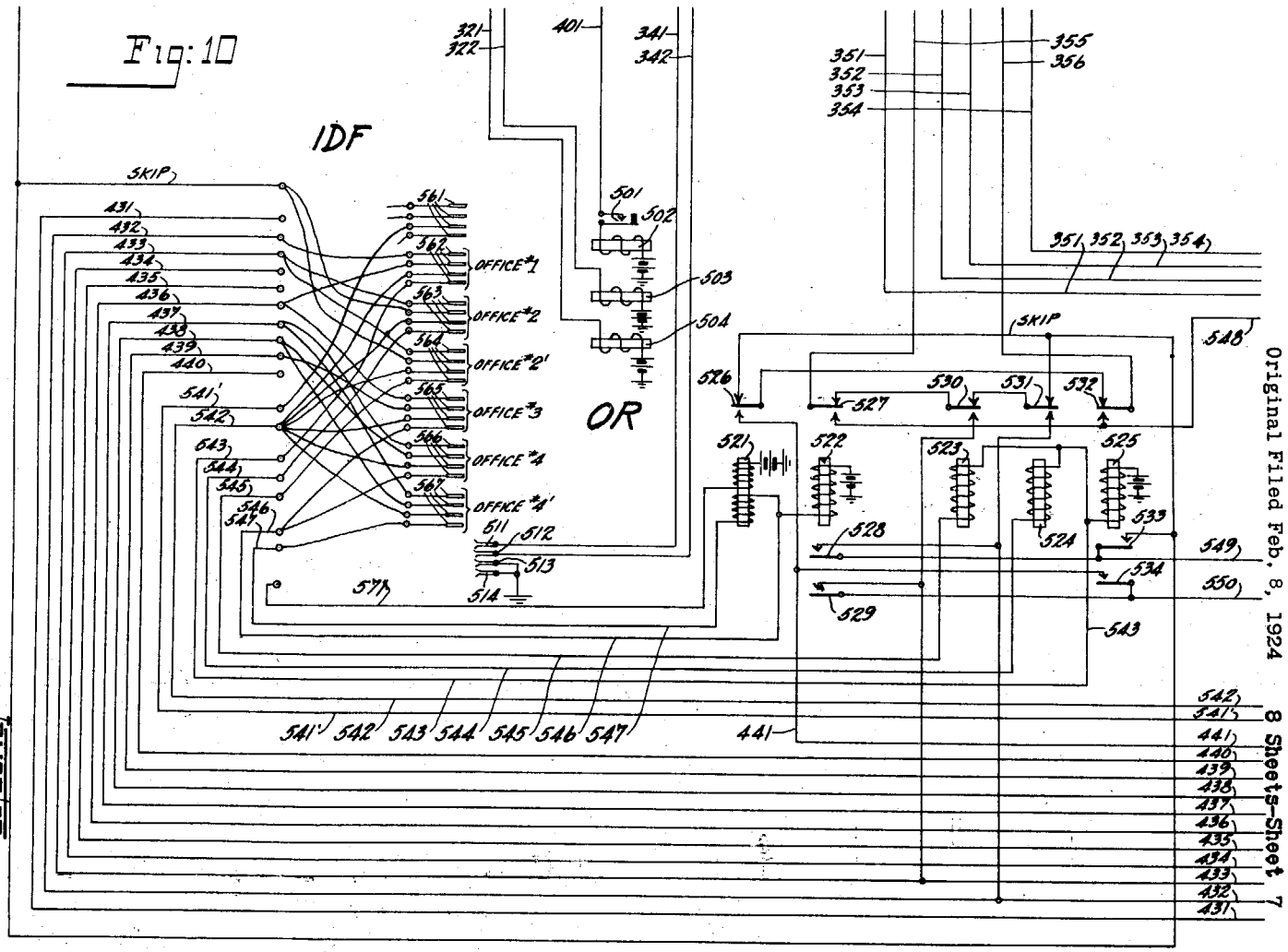
Figure 11:
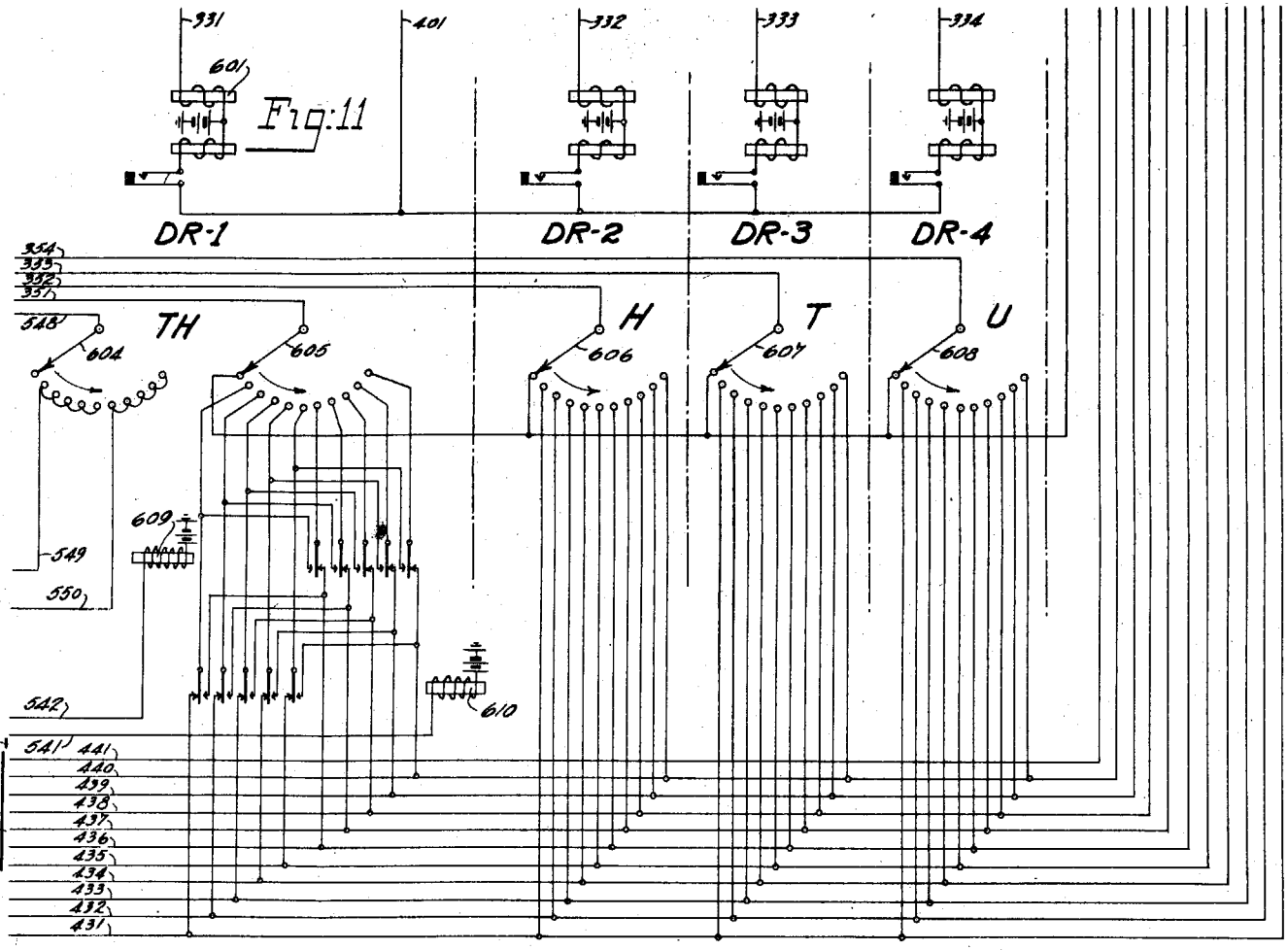

Referring now particularly to the director shown in Figs. 8–11, inclusive, the portion of the director shown in Fig. 8 comprises the impulse-control sequence switch S and the associated relays 301 and 302, together with the stop-conductor-control sequence switch S′; the portion of the director shown in Fig. 9 comprises the sending switch SEN, together with the associated relays 403–405, inclusive, and the release relay 402; the portion of the director shown in Fig. 10 comprises the intermediate distributing frame IDF, the office register OR, and the associated relays 521–525, inclusive; and the portion of the director shown in Fig. 11 comprises the digit registers DR—1–DR—4, inclusive, together with the translating relays 609 and 610.

The present system, having been thus described generally, will now be described in connection with a detailed description of the operation of the apparatus shown. For this purpose it will be assumed that the subscriber at substation A, Fig. 1, desires to converse with the subscriber at substation A′, Fig. 7. As far as the present invention is concerned, the part of the number designating the desired office is immaterial and no particular number will be assigned. The part of the number, however, which indicates the desired subscriber after the office is reached, is 5,000, as may be seen in Fig. 2. Accordingly, the subscriber at substation A removes his receiver and dials the two office digits of the number, followed by the four subscribers digits 5—0—0—0.

When the receiver is removed at substation A, line relay 15 of the line switch C energizes over line conductors 11 and 12 and places ground on private normal conductor 13 at armature 20, thereby making the calling line busy immediately and closing a circuit through switching relay 14 and stepping magnet 16 in series. Line relay 15 also connects step test wiper 23 to the junction of switching relay 14 and stepping magnet 16 at armature 21. In case the trunk upon which the wipers of the line switch are standing is idle, switching relay 14 energizes right away and seizes the said trunk. Assuming the trunk to be busy, however, there is a ground potential upon the test conductor thereof, and this ground potential is extended through test wiper 23 to the junction of switching relay 14 and stepping magnet 16. Switching relay 14 is accordingly short circuited and does not energize, and stepping magnet 16 operates in a buzzer-like manner and advances the wipers 22–24, inclusive, step by step in search of an idle trunk.

When an idle trunk is reached, which trunk, it will be assumed, is the one comprising conductors 25–27, inclusive, switching relay 14, being no longer short circuited, energizes. Stepping magnet 16, however, does not energize at this time on account of the high resistance of switching relay 14. Upon energizing, switching relay 14 opens the test circuit and prepares the holding circuit at armature 18, thereby making the seized trunk busy immediately; and at armatures 17 and 19 disconnects the line conductors 11 and 12 from the winding of line relay 15 and ground at armatures 17 and 19 and extends them by way of wipers 22 and 24, conductors 25 and 27, and armatures 43 and 45 and their resting contacts to the windings of line relay 35 of the trunk circuit TC. Line relay 35 thereupon energizes over the calling line and closes a circuit for release relay 36 at armature 38. Release relay 36, upon energizing, places ground on release trunk conductor 26 at armature 40, thereby completing the holding circuit for switching relay 14 of the line switch C before the slow acting line relay 15 has had time to deenergize. As a further result of the energization of release relay 36 of the trunk circuit TC, it closes at armature 41 a circuit through switching relay 46 and stepping magnet 47 of the secondary switch SS in series, and at armature 42 connects test wiper 54 to the junction of switching relay 46 and stepping magnet 47. Accordingly, the secondary switch SS selects an idle trunk in the same manner as above pointed out for the line switch C. In this case it will be assumed that the director shown in the drawings is the first one found to be idle. Accordingly, when the wipers 52–55, inclusive, of the secondary switch SS arrive upon the bank contacts in which the conductors 56–59, inclusive, terminate, switching relay 46 energizes; opens the test circuit and places ground on test wiper 54 at armature 50; connects up the impulse wiper 55 at armature 51; and at armatures 48 and 49 connects up wipers 52 and 53, thereby placing a bridge across conductors 62 and 64 of the selector D. This bridge includes wipers 52 and 53 of the secondary switch SS, conductors 56 and 57 and armatures 418 and 421, Fig. 9, and their resting contacts in multiple. Line relay 65 of the selector D accordingly energizes and closes a circuit for release relay 66 at armature 76. Release relay 66 thereupon energizes and places a multiple ground on release trunk conductor 63 at armature 77, and at armature 78 opens a point in the circuit of release magnet 71 and prepares a circuit for vertical magnet 72.

In the seized director, release relay 402 energizes responsive to ground being placed on release trunk conductor 58 through test wiper 54 of the secondary switch SS and removes ground from release conductor 401 at armature 417. Relay 402 also opens the normal restoring circuit of the sending switch SEN at armature 416, and at armature 415 opens the normal restoring circuit of the sequence switch S′.

The above described operations have all taken place responsive to the removal of the receiver at substation A, and the apparatus is now in readiness to receive the first office digit in the desired number. When the subscriber at substation A manipulates his calling device in accordance with the first office digit, a corresponding number of interruptions are produced in the circuit of line relay 35 of the trunk circuit TC, and each time line relay 35 deenergizes responsive to one of these interruptions, it closes at armature 39 a circuit for vertical magnet 504 of the office register OR, Fig. 10, as follows: from ground by way of the resting contact and armature 39, armature 51 and its working contact, wiper 55, conductor 59, series relay 301, Fig. 8, wiper 310 of the sequence switch S, the first associated bank contact conductor 321 and the vertical magnet 504, Fig. 10, to battery. By the operation of the vertical magnet 504, the wipers 511–514, inclusive, of the office register OR are raised step by step until they come to rest opposite the desired level of bank contacts. Relay 301, Fig. 8, is energized in series with vertical magnet 504 upon the first impulse of current delivered to the latter, and, being slow acting, maintains its armature 304 attracted throughout the entire series of impulses. Upon energizing, relay 301 closes a circuit for slow acting relay 302 which accordingly energizes and prepares at armature 305 a circuit for stepping magnet 306 of the sequence switch S.

At the end of the series of impulses delivered to the vertical magnet of the office register, series relay 301 deenergizes and opens the circuit of slow acting relay 302, and at the same time closes the circuit of stepping magnet 306 of the sequence switch S, whereupon the wipers 309 and 310 of the sequence switch S are advanced into engagement with the second set of bank contacts. An instant later, slow acting relay 302 deenergizes and opens the circuit of stepping magnet 306 at armature 305.

When the calling subscriber at substation A manipulates his calling device in accordance with the second office digit, a corresponding series of impulses is delivered over the circuit above traced, to wiper 310 of the sequence switch S, Fig. 8, and thence by way of conductor 322 to rotary magnet 503 of the office register OR. Rotary magnet 503 is accordingly operated to rotate the wipers 511–514, inclusive, into engagement with the desired set of bank contacts in the selected level, which in this case is the set 564 which is allotted to office #2′. The jumper, associated with the bank contact on which the first code-digit wiper 511 lands is connected at the other end to the third impulse-stop conductor 433, thereby predetermining that the first code digit to be sent out will be the digit 3.

The bank contact on which the second code-digit wiper 512 lands is connected by means of a jumper to the skip conductor, thereby predetermining that the second code-digit position will be skipped, the trunking layout being such that the desired office is reached at the end of the first code digit.

The bank contact upon which the grounded wiper 513 lands is connected by means of the associated jumper to conductor 542. Accordingly, relay 609, Fig. 11, energizes over conductor 542 and disconnects the last five associated bank contacts from the impulse-stop conductors 426–440, inclusive, and connects them to the first five implse stop conductors 531–536, inclusive. The thousands digits 6–0, inclusive, are thereby combined with the thousands digits 1–5, inclusive.

The bank contact upon which the grounded wiper 514 lands is connected by means of the associated jumper to conductor 545. Accordingly, relays 523 and 525 energize in series over conductor 545. Relay 523, upon energizing, disconnects the stop conductor 355 from the skip conductor at armature 530 and connects it to the third impulse-stop conductor 433, thereby predetermining that a series of three impulses will be transmitted after the thousands selector has been operated and before the registered hundreds digit is sent out. Relay 525, upon energizing, disconnects conductor 356 from the skip conductor at armature 532 and connects it to the wiper 604 of the thousands register DR—1. Relay 525 also connects the conductors 549 and 550, associated with the first and second halves, respectively of the bank contacts of wiper 604, to the skip conductor and to the eleventh impulse stop conductor 541, respectively. Accordingly, it is predetermined that the setting of the thousands register DR—1 will determine whether or not an extra series of eleven impulses shall be sent out between the vertical and rotary operations of the connector switch to be used in completing the call.

By the conjoint action of relays 301 and 302, Fig. 8, in response to the second office digit the wipers of the sequence switch S are again advanced one step. Wiper 309 at this time closes the impulse circuit, thereby starting the sender SEN, Fig. 9, to send out the first digit in the office code. However, before the description of this operation is taken up the description of the registration of the desired number will be completed.

When the calling subscriber at substation A manipulates his calling device in accordance with the first subscriber digit 5 in the desired number, the five impulses of current which are transmitted over the previously traced circuit to wiper 310 of the sequence switch S, Fig. 8, are sent over conductor 331 to the stepping magnet 601 of the first digit register DR—1, Fig. 11. Accordingly, the wipers 604 and 605 of the digit register DR—1 are rotated into engagement with the corresponding set of bank contacts.

When the calling subscriber manipulates his calling device in accordance with the second subscriber digit 0, the ten impulses of current thereby produced, are transmitted over the above traced circuit to wiper 310 of the sequence switch S and thence by way of conductor 332 to the stepping magnet of the second digit register DR—2. Accordingly, the wiper 606 is advanced into engagement with its last bank contact.

When the calling subscriber dials the third subscriber digit, ten impulses of current are delivered over the impulse circuit to wiper 310 of the sequence switch S, and are thence transmitted by way of conductor 333 to the stepping magnet of the third digit register DR—3, resulting in the wiper 607 being advanced into engagement with its last contact.

When the calling subscriber dials the next and last digit 0 of the number, ten impulses of current are delivered through wiper 310 of the sequence switch S and conductor 334 to the stepping magnet of the fourth digit register DR—4, resulting in the wiper 608 being stepped into engagement with the last bank contact.

At the end of the registration of the last subscriber digit, the wipers 309 and 310 of the sequence switch S are advanced another step and the wiper 310 engages a dead contact, and accordingly the said wipers remain in this position until the director is freed and the apparatus restored to normal.

The operation of the sending equipment will now be taken up. It will be remembered that upon the cessation of the second series of impulses delivered to the director, which impulses were transmitted to rotary magnet 503 of the office register OR, wipers 309 and 310 of the impulse control sequence switch S were advanced into engagement with the third set of bank contacts. When this occurs, wiper 309 connects the grounded interrupter lead over conductor 428 and through the resting contact an armature 426 to sending relay 403. As soon as interrupter 303 closes the circuit of sending relay 403, the latter energizes and opens a point in the outgoing control circuit at armature 418. This, however, does not produce any result owing to the fact that armature 418 and its contact are shunted by armature 421 and its contact. As a further result of the energization of sending relay 403, it closes at armature 419 a circuit for stepping magnet 406 of the sender SEN. Magnet 406 thereupon energizes and moves the associated pawl into engagement with another notch in the wiper-driving ratchet wheel, but does not move the wipers 407 and 408. Upon the subsequent deenergization of sending relay 403, it opens the circuit of stepping magnet 406 of the sender at armature 419, whereupon stepping magnet 406 deenergizes and advances the wipers 407 and 408 into engagement with the first set of bank contacts. Wiper 407 engages a grounded contact thereby closing a circuit for pick-up relay 404. Pick-up relay 404, upon energizing, prepares a locking circuit for stop relay 405 at armature 422; closes a circuit for stepping magnet 311 of the sending control sequence switch S′ at armature 420; and at armature 421 removes the shunt from around armature 418 and its contact so as to permit an interruption to be produced in the outgoing control circuit upon each of the subsequent energizations of the sending relay 403.

At the end of the third interruption produced in the outgoing control circuit, sending relay 403 deenergizes and opens the circuit of stepping magnet 406 of the sender, whereupon the wipers 407 and 408 are advanced into engagement with the fourth set of bank contacts. Wiper 408 thereupon completes the following circuit: from ground by way of the stop-conductor-control wiper 513 of the sending-control sequence switch S′, the first code-digit stop conductor 341, the first wiper 511 of the office register OR, the bank contact upon which it is standing, the associated jumper, the third impulse-stop conductor 433, the fourth contact in the bank of wiper 408 of the sender, and stop relay 405 to battery. Stop relay 405, upon energizing, completes a locking circuit for itself at armature 427, disconnects the deenergized sending relay 403 at armature 426, and at armature 423 opens the circuit of stepping magnet 311 of the sending control sequence switch S′, whereupon stepping magnet 311 deenergizes and advances the wipers 312 and 313 into engagement with the second set of bank contacts. When this occurs, the stop-conductor-control wiper 313 applies ground to the second code-digit-stop conductor 343, thereby closing a circuit over the second code-digit wiper 512, the bank contact upon which it is standing, the associated jumper, the skip conductor, and thence to battery by way of the interrupter contacts and magnet 311 of the sending control sequence switch S′. Stepping magnet 311 accordingly energizes again and interrupts its own circuit, whereupon it deenergizes and advances the wipers 311 and 312 into engagement with the third set of bank contacts in readiness to send out the first subscriber digit.

As a further result of the above pointed out energization of stop relay 405 of the sender, it closes at armature 424 a circuit through the bank contact upon which wiper 407 is standing, and wiper 407 for stepping magnet 406 through the associated interrupter contacts. Accordingly, the magnet 406 operates in the manner of a buzzer until the wipers 407 and 408 are stepped to the last set of bank contacts. When this occurs, wiper 407 is no longer grounded and the stepping operation ceases. Furthermore, wiper 407, in passing off the last grounded bank contact, opens the circuit of pick-up relay 404. Pick-up relay 404, however, is slow acting and does not energize immediately.

In the selector D, Fig. 5, each time the outgoing control circuit is interrupted by sending relay 403, as pointed out above, line relay 65 de-energizes and closes a circuit for vertical magnet 72 as follows: from ground by way of resting contact and armature 84, armature 76 and its resting contact, armature 78 and its working contact, series relay 67, and vertical magnet 72 to battery. By the successive operations of vertical magnet 72, the wipers 86–88, inclusive, of the selector D are raised step by step until they stand opposite the desired level of bank contacts. Relay 67 is energized in series with vertical magnet 72 upon the first impulse of current passing through it and, being slow acting, maintains its armature attracted throughout the vertical movement. Relay 67, upon energizing, prepares at armature 79 a circuit which is completed through interrupter contacts 74 and off normal contacts 75 for stepping relay 68 responsive to the closure of off normal contacts 75 when the switch shaft moves from its normal position. Upon energizing, stepping relay 68 closes a locking circuit for itself at armature 80, and at armature 81 prepares a circuit for rotary magnet 73.

Upon the cessation of the vertical movement, slow acting series relay 67 deenergizes and completes the circuit of rotary magnet 73 at armature 79. Rotary magnet 73 thereupon energizes and advances the switch wipers 86–88, inclusive, into engagement with the first set of bank contacts in the selected level, and near the end of its stroke, opens the circuit of stepping relay 68 at interrupter contacts 74. Relay 68 accordingly deenergizes and opens the circuit of rotary magnet 73 at armature 81, whereupon rotary magnet 73 deenergizes also and again closes its interrupter contacts. In case the trunk terminating in the first set of bank contacts is idle, switching relay 69 energizes immediately. Assuming the trunk to be busy, however, switching relay 69 is short circuited by the ground potential encountered on the busy test contact by test wiper 87 and does not energize. Under these conditions, test relay 68 is again energized, this time through test wiper 87, and, in addition to closing its usual locking circuit at armature 80, it again completes the circuit of rotary magnet 73 at armature 81, whereupon the wipers are advanced another step in the above manner.

This alternate operation of stepping relay 68 and rotary magnet 73 continues as described until an idle trunk is reached, which trunk it will be assumed is the one terminating in bank contacts 89–91, inclusive, and comprising conductors 92–94, inclusive. When such idle trunk is reached, switching relay 69, being no longer short circuited, energizes in series with stepping relay 68 and from the grounded release trunk conductor 63. Stepping relay 68, however, is not operatively energized at this time on account of the high resistance of switching relay 69. Switching relay 69, upon energizing, opens the test circuit and prepares the holding circuit at armature 83; removes ground from armature 76 of line relay 65 at armature 84, thereby opening the circuit of release relay 66; and at armatures 82 and 85 disconnects conductors 62 and 64 from relay 65 and extends them by way of wipers 86 and 88, bank contacts 89 and 91, and trunk conductors 92 and 94 to the windings of the line relay of the thousands selector E′ in the desired office, which, in this case, is office #2′. Accordingly, the line and release relays of the selector E′ (not shown) energize and the latter prepares the switch for operation in the usual manner.

Returning now to the director, slow acting pick-up relay 404 of the sender, Fig. 9, finally deenergizes and opens the locking circuit of the slow acting stop relay 405 at armature 422. Accordingly, slow acting relay 405 deenergizes after an interval and again connects up sending relay 403 at armature 406, whereupon the sender is started to send out the first subscriber digit 5. It may be pointed out at this time that the interval required for relays 404 and 405 to fall back one after the other, as described above, is utilized by the selector D in performing the change-over and trunk-hunting operations above described.

The sender has been restarted, as pointed out above, and is now sending out the first subscriber digit 5, and when the fifth interruption in the outgoing control circuit occurs, the following deenergization of sending relay 403 is followed by the advance of the wipers 407 and 408 into engagement with the sixth set of bank contacts, whereupon stop relay 405 energizes over the following circuit: from ground by way of the stop conductor control wiper 313 of the sending control sequence switch S′, Fig. 8, the third associated bank contact, the first subscriber digit stop conductor 351, wiper 605 of the digit register DR—1, the sixth associated bank contact, the right-hand armature of relay 610 and its resting contact, the fifth impulse-stop conductor 435, the corresponding contact in the sender bank, wiper 408, and stop relay 405 to battery. Responsive to the energization of stop relay 405, the first subscriber digit is terminated in the usual manner and the wipers of the sequence switch S′ are advanced one step responsive to the opening of the circuit of stepping magnet 311 at armature 423.

In the called exchange, the selector E′ raises its wipers opposite the fifth level responsive to the operation of the sender above described and then selects an idle trunk, which trunk, it will be assumed, is the one comprising conductors 101–103, inclusive, and extending to the wiper selecting hundreds selector F′. Accordingly, line relay 122 of the selector F′ is energized over the calling loop and closes at armature 131 the usual circuit for release relay 123. Release relay 123 thereupon energizes and places ground on release trunk conductor 102 at armature 132; opens a point in the circuit of release magnet 162 at armature 133; and at armature 134 shunts the lower winding of relay 101 around off normal contacts 163 for a purpose to be described hereinafter.

In the director, the wipers of the sending-control sequence switch S′ are now in engagement with the fourth set of associated bank contacts and ground is applied to the special wiper selecting stop conductor 355 by the stop-conductor-control wiper 313. This stopping ground is extended through armature 527 and its resting contact and armature 530 and its working contact (relay 523 having been energized as hereinbefore pointed out), to the third impulse-stop conductor 433. Accordingly, the next digit to be sent out is the digit 3 which is sent out in the usual manner and which is terminated upon the energization of stop relay 405 from the ground potential applied to the third impulse stop conductor 433 over the above traced circuit. At the end of the transmission of this wiper selecting digit 3, the wipers of the sequence switch S′ are advanced another step in the usual manner and ground is applied to the hundreds-digit stop conductor 352 by the stop-conductor-control wiper 313.

In the selector F′, Fig. 6, line relay 102 is deenergized three times momentarily, responsive to the sending out of the above mentioned wiper selecting digit and, accordingly, three impulses of current are transmitted at armature 31 to vertical magnet 164 by way of armature 133 and its working contact and series relay 124. By the operation of vertical magnet 164, the shaft of the switch is raised three steps and carries the wipers opposite the third level of bank contacts. The switch shaft also engages the shaft springs and closes the contacts 104 and 105 which are both placed so as to be operated when the shaft is raised three steps, as is indicated on the drawings. Upon the closure of the shaft-spring contacts 105, relay 127 is energized from the grounded release trunk conductor 102 and through the normally closed contacts controlled by armature 129 of relay 121. Upon energizing, relay 127 locks itself to the grounded release trunk conductor 102 at armature 145, and at armatures 143, 144, and 146 disconnects the upper set of wipers and connects up the lower set of wipers. Slow acting series relay 124 is energized throughout the vertical movement and closes a point in the circuit of stepping relay 125. Stepping relay 125, however, does not energize on account of the fact that its circuit is open at armature 130 of relay 121. Series relay 124 also maintains the ground potential disconnected from the shaft contacts 104 at armature 135.

At the end of the vertical movement, series relay 124 deenergizes and closes at armature 135 a circuit for release magnet 162 which includes the shaft spring contacts 104, resting contact and armature 128, and off normal contacts 163. It will be noted that the lower winding of relay 121 is included in this circuit except for the fact that it is shunted by off normal contacts 163. Responsive to the closure of this circuit, release magnet 162 energizes and closes at armature 161 a locking circuit for itself independent of armature 135 and the shaft spring contacts 104. Release magnet 162 also permits the shaft of the wipers of the switch to be restored to normal position, and when the shaft reaches its normal position, it removes the shunt from around the lower winding of relay 121 by opening the off normal contacts 163. When this occurs, relay 121 energizes; closes a locking circuit for itself and opens a point in the initial circuit of relay 127 at armature 129; closes a point in the circuit of stepping relay 125 at armature 130; and at armature 128 opens the circuit of its lower winding and release magnet 163, whereupon release magnet 163 becomes deenergized.

The net result of the transmission of the preliminary digit 3, it will be noted, is that the selector F′ has been raised to the third level, whereupon the wiper switching relay 127 became energized and disconnected the upper set of wipers and connected up the lower set of wipers, and the shaft and wipers have been restored to normal preparatory to the reception of the hundreds digit.

In the director, the hundreds digit 0 is now transmitted and is terminated responsive to the energization of stop relay 405 over the following circuit: from ground by way of the stop conductor control wiper 313 of the sequence switch S′, Fig. 8, the fifth associated bank contact, the hundreds digit stop conductor 352, wiper 606 of the second digit register DR—2, the eleventh associated bank contact, the tenth impulse stop conductor 440, the associated contact in the sender bank, wiper 408, and stop relay 405 to battery. Responsive to the energization of stop relay 405, the circuit of stepping magnet 311 of the sequence switch S′ is opened at armature 423 and the wipers 312 and 313 are advanced into engagement with the sixth set of bank contacts.

In the selector F′, Fig. 6, line relay 122 is deenergized ten times momentarily in response to the above described operation of the sender and, upon each deenergization, closes the previously traced circuit of vertical magnet 164. By the operation of vertical magnet 164, the switch wipers are raised opposite the tenth level of bank contacts. Series relay 124 is again maintained energized throughout the vertical movement and in conjunction with off normal contacts 167, which close upon the first vertical step, completes at armature 136 a circuit through armature 130 and its working contact and interrupter contacts 166 for stepping relay 125. Stepping relay 125, upon energizing, closes a locking circuit for itself at armature 137, and at armature 138 prepares a circuit for rotary magnet 165. From this point, the operation of the selector F′ is identical with the operation of the selector D previously described. Briefly, the rotary movement is initiated upon the deenergization of slow acting series relay 124 at the end of the vertical movement and continues until an idle trunk is reached by the wipers 150–152, inclusive, which trunk it will be assumed is the one comprising conductors 153–155, inclusive, and extending to the connector $H^2$. When this occurs, switching relay 126, being no longer short circuited, energizes in series with stepping relay 125 and switches the connection through to the selected set of wipers at armatures 139, 140 and 142, and at armature 141 opens the circuit of release relay 123 which subsequently deenergizes and removes the lower winding of relay 121 from around off normal contacts 163 so as to prevent the said lower winding from interfering with the regular releasing operation of the selector which is to take place subsequently.

In the connector $H^2$, line relay 201 now energizes over the calling loop responsive to the above mentioned seizure of the associated trunk and closes at armature 209 a circuit for release relay 203. Release relay 203 thereupon energizes; opens a point in the circuit of release magnet 231 and prepares a circuit for vertical magnet 230 at armature 212; prepares a circuit for the upper winding of switching relay 208 and for busy relay 206 at armature 211; and at armature 210 places ground on release trunk conductor 154.

In the director, when the sender is restarted, it continues to operate until ten impulses of current have been sent out, at which time stop relay 405 is energized over the following circuit; from ground by way of stop-conductor-control wiper 313 of the sequence switch S′, the sixth associated bank contact, the tens digit stop conductor 353, wiper 607 of the third subscriber digit register DR—3 the eleventh associated bank contact, the tenth impulse stop conductor 440, the associated contact of the sender bank, wiper 408, and relay 405 to battery. The energization of stop relay 405 terminates the tens digit in the usual manner and also results in the advance of the sequence switch S′ into engagement with the next set of bank contacts, whereupon stop-conductor-control wiper 313 applies ground to the special stop conductor 356, which stop conductor is connected through armature 352 and its working contact (relay 525 having been energized in series with relay 523 as above pointed out), and conductor 548 to wiper 604 of the first or thousands digit register DR—1. Since wiper 604 has been advanced into engagement with the sixth associated bank contact in response to the calling of the thousands digit 5, as above pointed out, the ground potential is extended by wiper 604 to conductor 549 and thence through armature 533 and its working contact to the skip conductor resulting in the usual operation of the sequence switch S′ to automatically advance its wipers to the next set of bank contacts. Accordingly, the extra set of eleven preliminary impulses cannot be delivered to the connector $H^2$ between the tens and units digits, and the upper set of wipers will therefore be used to complete the connection which is to be extended to the line of substation A′ which terminates in the upper bank of connector $H^2$.

In the connector $H^2$, line relay 201 deenergizes ten times momentarily responsive to the above operation of the sender and, upon each deenergization, completes a circuit for vertical magnet 230, the circuit at the time of its first closure being as follows: from ground by way of armature 209 and its resting contact, armature 212 and its working contact, the contact of off normal spring 229 and said spring, series relay 204, and vertical magnet 230 to battery. By the operation of vertical magnet 230, the shaft and wipers of the connector $H^2$ are raised step by step until the latter stand opposite the tenth level of bank contacts. Relay 204 is energized in series with vertical magnet 230 and, being slow acting, maintains its armature 213 attracted throughout the vertical operation and maintains its own circuit and that of vertical magnet 230 intact after the off normal springs have shifted as they do upon the first vertical step.

At the end of the vertical movement, slow acting series relay 204 deenergizes and shifts the impulse lead from the vertical to the rotary magnet.

In the director, the sender is again started to operate after the usual interval between digits and transmits the last digit in the number. This digit is terminated upon the energization of stop relay 405 of the sender through the stop-conductor-control wiper 513, the eighth associated bank contact, the units-digit stop conductor 354, wiper 608, the bank contact upon which it is standing, the associated impulse-stop conductor, and wiper 408 of the sender. Upon the energization of stop relay 405, the last digit in the number is terminated and the wipers of the sequence switch S′ are again advanced one step in the usual manner. At this time, the wiper 313 grounds the last contact in its bank and accordingly grounds conductor 59, thereby closing a circuit which extends from ground by way of the said conductor 59, the associated contact in the bank of wiper 55 of the secondary switch SS, Fig. 5, wiper 55, working contact and armature 51, armature 39 and its working contact, and switching relay 37 to battery. Switching relay 37 of the trunk circuit TC thereupon energizes and locks itself to the grounded release trunk conductor 63 at armature 44, and at armatures 43 and 45, disconnects conductors 25 and 27 from the windings of line relay 35 and extends them to trunk conductors 62 and 64, respectively, thereby bridging the calling line across said conductors 62 and 64 and at the same time disconnecting the control circuit of the sender from across the said conductors. Line relay 35 deenergizes responsive to being disconnected at armatures 43 and 45 and opens the circuit of release relay 36 at armature 38. Release relay 36 accordingly deenergizes after an interval and removes ground from release trunk conductor 63 at armature 40, leaving the established connection to be held up by the ground potential applied to release trunk conductor 154 by release relay 203 of the connector $H^2$, Fig. 7. Release relay 36 of the trunk circuit TC also opens the circuit of switching relay 46 of the secondary switch SS at armature 41, whereupon switching relay 46 deenergizes and disconnects its wipers, thereby freeing the director.

In the director, release relay 402 deenergizes responsive to the removal of ground from the release trunk conductor 58 when the director is freed as pointed out above and closes at armature 416 the normal restoring circuit of the sender SEN which is effective only in case the director is freed while the sender is not in its normal position. As a further result of the deenergization of release relay 402, it closes at armature 415 the normal restoring circuit of the sending control sequence switch S′, whereupon the wipers 312 and 313 are advanced the remaining step to their normal position, magnet 313 being energized through wiper 312. As a still further result of the deenergization of release relay 402, it applies ground to release conductor 401 at armature 417, thereby closing a circuit for the release magnet of the sequence switch S, for the release magnet of the office register OR, and for the release magnets of digit registers DR—1–DR—4, inclusive. When this occurs, release magnet 307 of the sequence switch S energizes through the associated off normal contacts 308, and the wipers 309 and 310 are restored to normal position in the usual manner, whereupon the circuit of release magnet 307 is opened at off normal contacts 308. Release magnet 502 of the office register OR is energized through the associated off normal contacts 501, whereupon the wipers 511–514, inclusive, are restored to normal position in the usual manner. The digit registers DR—1–DR—4, inclusive, are restored to normal position in the same manner as the sequence switch S.

Responsive to the restoration of the wipers of the office register OR to normal, relays 523 and 525, Fig. 10, and relay 609, Fig. 11, deenergize.

The various pieces of apparatus of the director have been restored to their normal positions and the director is now in readiness to handle another call.

In the connector $H^2$, Fig. 7, line relay 201 is momentarily deenergized for each of the interruptions produced in its circuit by the hereinbefore described operation of the sender in sending out the last digit of the number, and upon each deenergization, line relay 201 closes a circuit for rotary magnet 232 as follows: from ground by way of armature 209 and its resting contact, armature 212 and its working contact, normally opened contacts controlled by off normal spring 229, armature 213 and its resting contact, resting contact and armature 219, armature 220 and its resting contact, and rotary magnet 232 to battery. By the operation of rotary magnet 232, the wipers 251–253, inclusive, and the wipers 261–263, inclusive, are rotated step by step until the former come into engagement with the bank contacts 254–256, inclusive, of the line of substation A′. The wipers 261–263, inclusive, it may be pointed out, do not engage any of the associated bank contacts owing to the fact that the extra series of eleven impulses were not transmitted between the tens and units digits.

Relay 207 of the connector is energized in multiple with rotary magnet 232 and, being slow acting, maintains its armature attracted throughout the rotary movement. Upon energizing, relay 207 disconnects test wiper 252 from the upper winding of switching relay 208 and connects it to busy relay 206, and at armature 222 places a shunt around armature 219 and its resting contact as a precaution against the circuit of the rotary magnet being opened at armature 219 in case busy relay 206 energizes during the rotary movement due to wiper 252 passing over grounded test contacts.

Assuming the called line to be busy, busy relay 206 is energized through test wiper 252 and from a ground potential encountered on the busy test contact 255 and prepares a locking circuit for itself at armature 218; opens a point in the circuit of the rotary magnet at armature 219; and at armature 220 connects the busy lead to the lower heavy talking conductor, thereby sending a busy signalling current back over the established connection to the called substation. When relay 207 deenergizes, it disconnects rotary magnet 232 from the impulse circuit at armature 222 (armature 219 having been operated), and at armature 221 completes the locking circuit for busy relay 206 and disconnects test wiper 262 from the said busy relay.

The calling subscriber, upon hearing the busy tone, replaces his receiver, whereupon the established connection is released in a manner to be explained hereinafter.

In the present case, however, it will be assumed that the line of substation A′ is idle when called as hereinbefore described, in which case busy relay 206 is not energized when the wipers 251–253, inclusive, come to rest upon the terminals of the called line and, when slow acting relay 207 deenergizes at the end of the rotary movement, it disconnects test wiper 252 from the winding of busy relay 206 and connects it to the upper winding of switching relay 208 at armature 221, thereby closing a circuit for switching relay 208 as follows: from ground by way of the working contact and armature 211, armature 218 and its resting contact, upper winding of switching relay 208, resting contact and armature 221, test wiper 252, test contact 255, and thence to battery by way of the switching relay and stepping magnet of the associated line switch (not shown), which line switch may be the same as the line switch C, associated with the line of substation A. Responsive to the closure of this circuit, the switching relay of the called line switch energizes part way in the usual manner and disconnects the bridge across the line conductors thereat.

In the connector $H^2$, switching relay 208 energizes over the above traced circuit and at its lightly adjusted armature 221 closes a locking circuit for its lower winding; disconnects rotary magnet 232 and slow acting relay 207 at armature 220; places direct ground on the test wiper at armature 224; and at armature 223 and 227 connects up the line wipers, whereupon ringing current is projected out over the called line to ring the bridged bell at the called substation. This ringing current returns by way of the upper line wiper 251 to battery by way of the upper winding of ring cut-off relay 205.

When the called subscriber responds to the ringing of his bell by removing his receiver, a direct current bridge is closed across the associated line conductors, whereupon ring cut-off relay 205 energizes; closes a locking circuit for itself at its lightly adjusted armature 216 and at armatures 214 and 217 disconnects the line wipers from its own upper winding and the generator lead and connects them instead to the windings of the back bridge battery feed impedance 202. The desired connection is now completed and the subscribers may converse as desired.

When the conversation is completed, the two subscribers replace their receivers. When the receiver is replaced at the called substation A′, talking battery merely ceases to flow in the called line, but when the receiver is replaced at substation A, the circuit of line relay 201 of the connector $H^2$ is opened, whereupon line relay 201 deenergizes and opens the circuit of release relay 203. Release relay 203, upon energizing after an interval, removes ground from release trunk conductor 154 at armature 210, and at armature 212 completes a circuit for release magnet 231 through off normal contacts 228, whereupon the switch is restored to normal position in the usual manner.

Responsive to the removal of the ground potential from conductor 154, ring-cut-off relay 205 and switching relay 208 of the connector H, relays 121, 126, and 127 of the selector F′, the switching relay (not shown) of the selector E′, switching relay 69 of the selector D, switching relay 37 of the trunk circuit TC, and switching relay 14 of the line switch C all deenergize. Responsive to the deenergization of the relays mentioned, the associated switches are released in the usual manner. The entire connection is now released and the apparatus involved therein may now be used in setting up a subsequent connection.

In order to explain how the necessary translation is effected when the thousands digit is above 5, and in order to explain how the lower set of wipers of the connector $H^2$, Fig. 7, are used when such translation of the office digit takes place, it will now be assumed that the subscriber at substation A desires to converse with the subscriber at substation $A^2$, Fig. 7. It will be assumed further that, when the receiver is removed at substation A, the line switch C selects the trunk circuit TC, and that the secondary switch SS selects the director shown in the drawings. Accordingly, responsive to the manipulation of the calling device in accordance with the office digits belonging to office #2′, the wipers of the office register OR, Fig. 10, are raised opposite the desired level in the hereinbefore described manner, and are then brought into engagement with the set of bank contacts 564 of the office #2′ as before explained.

Responsive to the manipulation of the calling device at substation A in accordance with the four subscriber digits 0000, the digit registers DR—1–DR—4, inclusive, are set upon the corresponding bank contacts in the usual manner.

The office code is at this time sent out in the same manner as hereinbefore described, (operating the selector D to seize the selector E), after which the stop conductor control wiper 313 of the sending control sequence switch S′ is advanced into engagement with its third bank contact, thereby placing ground through the thousands digit stop conductor 255 of the wiper 605, which as explained hereinbefore has been advanced ten steps and is now in engagement with the last of its bank contacts. Since relay 609, Fig. 11, is energized through the lower wiper of the office register and through conductor 542, the last contact in the bank of wiper 605, is now disconnected from the tenth impulse stop conductor 440 and is connected instead to the fifth impulse stop conductor 435. Accordingly, the thousands digit to be sent out is the thousands digit 5, which causes the selector E′, Fig. 6, to be raised to the fifth level to select a hundreds selector in the corresponding group, the selector F′, for example, in the same manner as described hereinbefore.

Since relay 523, Fig. 10, is energized as in the preceding example when the substation A′ was called, the wiper-selecting digit 3 is delivered to the selector F′, causing it to select the lower set of wipers in the same manner as before. Following this, the hundreds digit 0 is delivered to the selector F′ in accordance with the setting of the digit register DR—2, Fig. 11, resulting in the wipers of the selector F′ being raised to the tenth level to select an idle connector in the corresponding group, the connector $H^2$, for example.

In accordance with the setting of the digit register DR—3, the tens digit 0 is delivered to the connector $H^2$, whereupon its wipers are raised opposite the tenth level of bank contacts. Upon the termination of this digit, the wipers 313 of the sequence switch S′ are advanced into engagement with the seventh bank contact, in which the special stop conductor 356 terminates. Ground is accordingly extended over stop conductor 356 and through armature 532 and its working contact (relay 525 being energized in series with relay 523), to wiper 604 of the thousands-digit register DR—1, by way of conductor 548. Since wiper 604 is standing on the last half of its bank instead of the first half, the ground potential is not extended to the skip conductor as it was in the case just described when the called subscriber was the one at substation A′, but is extended instead through conductor 550 and armature 534 and its working contact, to the eleventh impulse-stop conductor 441. Accordingly, eleven interruptions are produced in the circuit of line relay 201 of the connector H by the sender which results in the wipers 251–253, inclusive, being rotated entirely over the associated bank of contacts, and in the wipers 261–263, inclusive, being brought within one step of the associated bank of contacts in readiness to be brought into engagement with the desired set of contacts responsive to the transmission of the units digit. In the director, wiper 313 of the sending control sequence switch S′ is advanced into engagement with the eighth associated bank contact in the usual manner, following the transmission of the above mentioned series of eleven impulses, and the last digit 0 is set out in the hereinbefore described manner, whereupon the sequence switch S′ is again advanced and the director is released and the connection switched through as described hereinbefore.

In the connector $H^2$, Fig. 7, the wipers 261–263, inclusive, are advanced into engagement with the bank contacts 264–266, inclusive, responsive to the sending out of the last digit 0. From this point on the operation is as described hereinbefore.

Referring now particularly to Fig. 10, it will be noted that when this director is used in completing a call to a line in office #2, Fig. 2, the wiper 513 completes a circuit over one of the contacts 563, the associated jumper, and conductor 542 for the translating relay 609, as is the case when the office #2′ is called. Wiper 514, however, instead of completing a circuit over conductor 543 for the relays 523 and 525 in series, as is the case when office #2′ is called, completes a circuit over conductor 544 for the relays 524 and 525 in series. Accordingly, the wiper selecting digit to be delivered to a hundreds selector, such as the hundreds selector F′, Figs. 2 and 6, is two instead of three, armature 531 of relay 524 connecting conductor 355 to the second impulse-stop conductor 532 instead of to the third impulse-stop conductor 433, as is the case when relay 523 is energized. Otherwise the number received by the director and intended for office #2 is handled just the same as described hereinbefore for a number received by the director and intended for office #2′.

When a call is received by the director which is intended for office #1, Fig. 1, the director must not send out a wiper selecting digit just prior to the sending out of the hundreds digit, on account of the fact that the hundreds selector F, Fig. 1, has only one set of wipers. Accordingly, the fourth bank contact in the set allotted to office #1, Fig. 10, instead of being connected to either of the conductors 544 and 545, is connected to conductor 543, and relay 525 is energized alone and performs the hereinbefore mentioned function of shifting the circuits so that the sending out of the extra series of eleven preliminary impulses by the tens and units digits is dependent upon the thousands digit dialled.

When a call is received by the director shown, that is intended for a line in office #3, Fig. 3, the wipers 511–514, inclusive, are brought into engagement with the bank contacts 565, Fig. 10, as is indicated in the drawings. In this case, the bank contact on which the third wiper 513 of the office register OR stands, is connected by means of a jumper to the conductor 542, as explained in connection with the preceding example, so as to pull up the translating relay 609 in order to send out all of the calls through the first five levels of the selector E′, Fig. 3. In addition to the above, the bank contact engaged by the fourth wiper 514 of the office register OR is connected by means of a jumper to conductor 546, so as to energize relay 522. Relay 522, upon energizing, disconnects conductor 355 from the skip conductor at armature 527 and extends it by way of conductor 548 to wiper 604 of the thousands-digit register DR—1. Relay 522 also connects the two conductors 549 and 550 coming from the contacts in the bank of wiper 604 to the second and third impulse-stop conductors 432 and 433, respectively. Accordingly, after the thousands digit is transmitted and before the hundreds digit is transmitted, either the digit 2 or the digit 3 will be transmitted in order to effect the correct wiper selection at the twenty group hundreds selector $F^2$. This wiper selection is controlled in accordance with the thousands digit registered by the thousands-digit register DR—1, and if the thousands digit is from 1 to 5, inclusive, the wiper-selecting digit 2 is sent out to select the upper set of wipers of the selector $F^2$, and if the thousands-digit register is from 6 to 0, inclusive, the wiper-selecting digit 3 is sent out, resulting in the lower set of wipers of the selector $F^2$, Fig. 3, being selected.

It will be noted that in this case, it is not necessary to make any arrangements for controlling the selection of the wipers of the connectors, such as connectors $H^3$ and $H^4$, owing to the fact that these connectors are of the 100 line type, having only a single set of wipers.

When the director shown is used in completing a call to office #4, Fig. 4 the wipers of the office register OR are brought into engagement with the bank contacts 566 whose third and fourth contacts are jumpered in exactly the same way as the corresponding contacts associated with office #3. Accordingly, when the call is trunked to the selector $E^3$ in accordance with the jumpering of the contacts engaged by the wipers 511 and 512, the number is transmitted in the same manner as explained in connection with office #3 and the upper set of wipers of the connector in use is employed to complete the connection, the upper set of wipers of the connectors $H^5$ and $H^6$ corresponding to the single set of wipers of the connectors $H^3$ and $H^4$.

When, however, the present director is used to complete a connection to office #4′, the wipers of the office register are brought into engagement with the bank contacts 567, whereupon relays 521 and 522 are energized in series over conductor 547. Relay 522 performs the function above described in connection with the trunking of calls to offices #3 and #4 and relay 521 performs the added function of disconnecting conductor 356 from the skip conductor and connecting it to the eleventh impulse-stop conductor 441, thereby pre-determining that the wiper-selecting digit 11 is to be sent out after the transmission of the tens digit and before the transmission of the units digit, so as to cause the lower set of wipers of the connector in use to be used in completing the connection instead of the upper set, as is the case when relay 522 is energized alone.

As pointed out hereinbefore, either of the layouts shown in Figs. 2 and 4, when duplicated by the addition of the necessary switches accessible to the sixth to tenth levels, inclusive, of the thousands selectors, provides for four 10,000-line offices reached through the same thousands selectors. From the above it follows that, in such cases as desired, the thousands selectors may be changed from the type having only one set of wipers to the type having two sets of wipers, like the selector F′, Fig. 6, in which case the desired wiper selecting digit may be sent to this thousands selector in the same manner as the desired digit is sent to any of the selectors employed in inter-office trunking, for example, the selector D, Fig. 5. Specifically, when this is done, the necessary cross connection is made on the IDF to trunk the call to the desired office, and in addition, the next wiper of the office register, wiper 512 for example, is cross connected to either the second or third impulse-stop conductor, depending upon whether the desired office is reached by way of the upper or lower set of banks of the thousands selectors.

It will be understood, of course, that, although only two code digit wipers 511 and 512 are shown on the office register OR, as many code digit wipers as necessary and desirable may be employed to secure the desired result. That is, if two code digit wipers are necessary to operate the selectors used in trunking the call to the desired office, then a third code digit wiper must be employed to send out the wiper-selecting digit for the thousands selector in case the thousands selectors in the called office are of the twen y-group type.

It may be pointed out at this time that the director shown in Figs 8–11, inclusive, may be used in connections with various trunking layouts, other than the ones shown. To this end, the director is arranged so that the subscriber digits of any number are normally retransmitted exactly as registered and no extra wiper-selecting digits are sent out at any point after the desired office is reached. Accordingly, the director may be used to trunk calls to a 10,000-line office in which the trunking is laid out in a straight decimal basis. From this it naturally follows that, when desired, the capacity of a 10,000-line office so laid out may be doubled by adding an extra set of banks and wipers to each of the connector switches, in which case the original banks and wipers and the associated lines may be termed the first office and the added banks and wipers, together with the associated lines, may be termed the second office. When the first office is called, the subscriber digits are sent out untranslated and unchanged as before, while when the second office is called, an extra series comprising eleven impulses is transmitted between the regular tens and units digits, and the sending out of the extra series of impulses is effected by the director in the manner hereinbefore described responsive to the energization of relay 521. In this latter case, however, relay 521 is energized over conductor 571 and through its upper winding, rather than over conductor 547 and through its lower winding in series with relay 522, as pointed out in connection with the handling of calls to office #4′.

It will readily be seen that, if desired, the relays 523 and 524 may each be provided with an extra winding and the necessary circuit connections, so that they may be controlled independent of relay 525 to effect the sending out of a preliminary wiper-selecting digit 2 or 3 in order to control the selection of wipers of the hundreds selectors in case the capacity of the selectors in the situation now being considered is now doubled by the addition of extra banks and wipers.

What is claimed is:

1. In a multi-office telephone system wherein telephone numbers consist respectively of an office designation and a numerical designation, a train of automatic switches for connecting a calling and called line, a director comprising registering apparatus and sending apparatus controlled by said registering apparatus to produce series of impulses for operating said switches, two sets of wipers in one of said switches, and means in said director controlled in accordance with the office designations of called numbers for controlling the selection of either set of wipers.

2. In a multi-office telephone system wherein telephone numbers consist respectively of an office designation and a numerical designation, a train of automatic switches for connecting a calling and called line, a director comprising registering apparatus and sending apparatus controlled by said registering apparatus to produce series of impulses for operating said switches, two sets of wipers in one of said switches, means in said director controlled in accordance with the office designations of called numbers for controlling the selection of either set of wipers, and circuit arrangements in said director such that the set selected is made dependent upon the setting of said registering apparatus.

3. In a telephone system, a train of automatic switches for connecting a calling and called line, a director comprising registering and sending apparatus for operating said switches, two sets of wipers in one of said switches, one set only being normally in operative relation to its contact bank, and means in said director for causing said sending apparatus to transmit an extra series of impulses to said switch to operatively position the normally inoperative set of wipers.

4. In a telephone system, a train of automatic switches for connecting a calling and called line, a director comprising registering and sending apparatus for operating said switches, two sets of wipers in one of said switches, one set only being normally in operative relation to its contact bank, means in said director for causing said sending apparatus to transmit an extra series of impulses to said switch to operatively position the normally inoperative set of wipers, and circuit arrangements in the director such that the transmission of the extra series of impulse is made dependent upon the setting of said registering apparatus.

5. In a telephone system, a train of automatic switches for connecting a calling and called line, a director comprising registering and sending apparatus for operating said switches, two sets of wipers in one of said switches, the first set only being normally in use for connecting purposes, and means in said director for controlling said switch to put the second set of wipers in use in place of the first.

6. In a telephone system, a train of automatic switches for connecting a calling and called line, a director comprising registering and sending apparatus for operating said switches, two sets of wipers in one of said switches, the first set only being normally in use for connecting purpose, means in said director for controlling said switch to put the second set of wipers in use in place of the first, and circuit arrangements in the director such that the substitution of the second set of wipers is made dependent upon the value of a digit used to operate one of the preceding switches.

7. In a telephone system, a train of automatic switches for connecting a calling and called line, a director comprising registering and sending apparatus for operating said switches, two sets of wipers in one of said switches, the first set only being normally in use for connecting purposes, means in said director for controlling said switch to put the second set of wipers in use in place of the first, and circuit arrangements in the director such that the substitution of the second set of wipers is made dependent upon the setting of said registering apparatus.

8. In a telephone system, a train of automatic switches for connecting a calling and called line, a director comprising registering apparatus and sending apparatus controlled by said registering apparatus to transmit series of impulses for operating said switches, two sets of wipers in each of two of said switches, means in said director for controlling wiper selection and circuit arrangements such that the wiper selection at one of said switches is made dependent upon the setting of a portion of said registering apparatus while the wiper selection at the other switch is made dependent upon the setting of another portion of said registering apparatus.

9. In a telephone system, a train of automatic switches for connecting a calling and called line, a director comprising registering apparatus and sending apparatus controlled by said registering apparatus to transmit series of impulses for operating said switches, two sets of wipers in each of two of said switches, and means in said director for controlling wiper selection in said last mentioned switches in accordance with the setting of said registering apparatus.

10. In a telephone system, a train of automatic switches for connecting a calling and called line, a director comprising registering and sending apparatus for operating said switches, said registering apparatus comprising an office register and a plurality of digit registers, two sets of wipers in one of said switches, one set of wipers corresponding to one office exclusively and the other set corresponding to another office exclusively, and means in said director for controlling wiper selection in accordance with the setting of the office register.

11. In a telephone system, a train of automatic switches for connecting a calling and called line, a director comprising registering and sending apparatus for operating said switches for transmitting series of digit impulses, said registering apparatus comprising an office register and a plurality of digit registers, two sets of wipers in a single one of said switches, and means in said director for controlling wiper selection in accordance with the setting of one of the digit registers by transmitting a series of impulses containing more impulses than any digit series.

12. In a telephone system, a train of automatic switches for connecting a calling and called line, a director comprising registering and sending apparatus for operating said switches by transmitting series of digit impulses, said registering apparatus comprising an office register and a plurality of digit registers, two sets of wipers in a single one of said switches, and means in said director for controlling wiper selection in accordance with the setting of the thousands digit register by transmitting a series of impulses containing more impulses than any digit series.

13. In a telephone system, a train of automatic switches for connecting a calling and called line, a director comprising registering and sending apparatus for operating said switches, said registering apparatus comprising an office register and a plurality of digit registers, two sets of wipers in each of two of said switches, and means in said director for controlling wiper selection at one of said switches in accordance with the setting of the office register and wiper selection at the other switch in accordance with the setting of one of said digit registers, the operation of said one switch to further extend the connection being controlled in accordance with the setting of still another of said digit registers.

14. In a director for automatic telephone systems, an office register and a plurality of digit registers, sending apparatus for transmitting series of impulses determined by the setting of said registers, a relay controlled by said office register, and means controlled jointly by said relay and a wiper of one of the digit registers for causing said sending apparatus to transmit an extra fixed series of impulses.

15. In a director for automatic telephone systems, an office register and a plurality of digit registers, sending apparatus for transmitting series of impulses determined by the setting of said registers, a relay controlled by said office register for causing said sending apparatus to transmit an extra series of impulses, and means including a wiper of one of said digit registers for determining the number of impulses in said extra series.

16. In a director for automatic telephone systems, an office register and a plurality of digit registers, sending apparatus for transmitting series of impulses determined by the setting of said registers, and a relay controlled by said office register for causing said sending apparatus to transmit an extra series of impulses between two series of digit impulses.

17. In a director for automatic telephone systems, an office register and a plurality of digit registers, sending apparatus for transmitting series of impulses determined by the setting of said registers, two relays controlled by said office register, means controlled by the first relay for causing said sending apparatus to transmit an extra series of impulses, and means controlled jointly by the second relay and a wiper of one of said digit registers for causing said sending apparatus to transmit another extra series of impulses.

18. In a director for automatic telephone systems, an office register and a plurality of digit registers, sending-apparatus for transmitting series of impulses determined by the setting of said registers, a relay for causing said sending apparatus to transmit an extra fixed series of impulses between two series of digit impulses, a second relay for causing the transmission of a different fixed series of impulses, and circuits for said relays controlled by said office register.

19. In a director for automatic telephone systems, an office register and a plurality of digit registers, sending apparatus for transmitting series of impulses determined by the setting of said registers, means for causing said sending apparatus to insert an extra series of impulses between the tens digit impulses and the units digit impulses, a relay controlled by said office register, and circuit arrangements controlled jointly by said relay and a wiper of one of said digit registers for determining whether or not the extra series of impulses will be inserted.

20. In a director for automatic telephone systems, an office register and a plurality of digit registers, sending apparatus for transmitting series of impulses determined by the setting of said registers, a relay for causing said sending apparatus to insert an extra series of impulses between the tens digit impulses and the units digit impulses, and a circuit for said relay controlled by said office register.

21. In a director for automatic telephone systems, an office register and a plurality of digit registers, sending apparatus for transmitting series of impulses determined by the setting of said registers, and a relay controlled by said office register for causing said sending apparatus to transmit an extra series of impulses between the thousands digit impulses and the hundreds digit impulses.

22. In a director for automatic telephone systems, an office register and a plurality of digit registers, sending apparatus for transmitting series of impulses determined by the setting of said registers, a relay controlled by said office register for causing said sending apparatus to transmit an extra series of impulses between the thousands digit impulses and the hundreds digit impulses, and means including a wiper of one of said digit registers for determining the number of impulses in said extra series.

23. In a director for automatic telephone systems, an office register and a plurality of digit registers, sending apparatus for transmitting series of impulses determined by the setting of said registers, a sequence switch having a plurality of positions corresponding to the series of digit impulses and an intervening position providing for an extra series of impulses, a skip conductor for causing said sequence switch to pass through said intervening position without waiting for the extra series, and a relay controlled by said office register for opening said skip conductor to cause the extra series of impulses to be transmitted.

24. In a director for automatic telephone systems, an office register and a plurality of digit registers, sending apparatus for transmitting series of impulses determined by the setting of said registers, a sequence switch having a plurality of positions corresponding to the series of digit impulses and an intervening position providing for an extra series of impulses, a skip conductor for causing said sequence switch to pass through said intervening position without waiting for the extra series, and means for opening said skip conductor responsive to a particular setting of said office register.

25. In a director for automatic telephone systems, an office register and a plurality of digit registers, sending apparatus for transmitting series of impulses determined by the setting of said registers, a sequence switch having a plurality of positions corresponding to the series of digit impulses and an intervening position providing for an extra series of impulses, a skip conductor for causing said sequence switch to pass through said intervening position without waiting for the extra series, and means for opening said skip conductor responsive to particular settings of the office register and one of the digit registers.

26. In a director for automatic telephone systems, an office register, a digit register, a plurality of stop conductors terminating in the bank contacts of said digit register, and a relay controlled by said office register for disconnecting a plurality of the digit register contacts from the associated conductors and for connecting such contacts multiple with a plurality of the remaining contacts.

27. In a director for automatic telephone systems, an office register, a digit register, a plurality of stop conductors terminating in the bank contacts of said digit register, and a relay controlled by said office register for disconnecting half of said contacts from the associated conductors and for connecting such contacts to the other half in multiple.

28. In a telephone system, a thousands selector operated in accordance with either of two different thousands digits to select the same set of contacts, a hundreds selector connected to said contacts and having two sets of wipers, and means for selecting wipers on said hundreds selector in accordance with the digit used to control said thousands selector.

29. In a telephone system, a switch having two sets of wipers, means for selecting said switch in accordance with the hundreds digit of telephone numbers, means for selecting wipers in accordance with either of two adjacent thousands digits, and means for operating said switch in accordance with tens and units digits.

30. In a telephone system, a hundreds selector and means for selecting the same in accordance with either of two non-adjacent thousands digits, a connector having two sets of wipers, means for operating said hundreds selector in accordance with the hundreds digit to select said connector, and means for selecting wipers on said connector in accordance with the thousands digit used to select said hundreds selector.

31. In a multi-office telephone system in which telephone numbers consist, respectively, of an office designation followed by a plurality of subscriber's-number digits, means including an automatic switch for setting up a connection from a calling line to a called line, said switch having a plurality of sets of wipers, means for selecting one of said sets of wipers in accordance with the office designation of the desired number, and means for operating the switch to extend the connection over the selected set of wipers in accordance with one of said subscriber's-number digits.

32. In a telephone system, an automatic switch having two sets of wipers, one set being normally connected up for use and the other set being normally disconnected, a normal position for said switch, means for operating said switch from its normal position in accordance with either of two digits whereby a position is attained by said switch depending upon the digit used, means for automatically restoring said switch to its normal position responsive to the last named operation, means for switching wipers or not according to the position attained by said switch, and means for again operating said switch to extend a connection through the set of wipers connected up at the end of the preceding operation.

33. In combination, an automatic switch provided with a set of wipers normally connected up and another set of wipers normally disconnected, said switch being adapted to respond to a preliminary digit and be again restored to normal in order to switch from one set of wipers to the other, means responsive to the reception of a different preliminary digit for restoring said switch to normal without switching wipers.

34. In a telephone system, an automatic switch having wipers, a bank of contacts accessible to said wipers, said switch being normally unable to effect a connection with any bank contact through any of its wipers, means for operating said switch preliminarily in response to a received digit and for again restoring it to normal, said switch being operative in response to a second digit, and means rendered effective upon the first named operation of the switch for permitting a connection to be made by said switch through one of its wipers and a bank contact when it is operated in response to the second digit.

35. In a multi-office telephone system in which telephone numbers consist, respectively, of an office designation followed by a plurality of subscriber-number digits, switching means for setting up connections, a director for controlling said switching means including a plurality of registering devices for registering subscriber-number digits and a sender operating under the control of said devices and according to the setting thereof to control the switching means, an office reg ister in said director set in accordance with the office designation to control said sender in controlling the extension of connection to the desired office, and means controlled in accordance with the setting of said office register for varying the effect upon the operation of said sender of the settings of the other registers in the director.

36. In a multi-office telephone system, a director comprising an office register having a different setting for each office and a plurality of subscriber-digit registers, automatic switching mechanisms for setting up connections, a sender operated first to control said switching mechanism to extend a connection to the office designated by the setting of said office register and operated subsequently to transmit untranslated the digits stored on the other digit registers in the director to complete the connection to the desired line, and means in said director controlled by said office register when it is set in a different position in accordance with the designation of a different called office for changing the control exercised over said sender by the other digit registers so that the subscriber digits are translated.

37. In a telephone system, switching mechanism for establishing connections, a director for controlling said mechanism comprising an office register set in accordance with the designation of the desired office and a plurality of subscriber-digit registers set in accordance with the line desired in the called office together with a sender operated under the successive control of said registers for exercising the said control over said automatic switches, the trunking local within one office being laid out according to a given system, the trunking local within another office being laid out according to another system, and means in said director controlled in accordance with the setting of said office register for varying the effect of a given setting of the subscriber-digit registers upon the sending apparatus to conform to the layout of trunking local within the called office.

38. In a multi-office automatic telephone system employing register senders for controlling the operation of the automatic switches, a plurality of means in the register senders for translating the impulses corresponding to the numerical assignation of the called lines, and means in the register senders controlled in accordance with the instant called office for causing the numerical assignation of the called line to be retransmitted untranslated or for causing a particular translation of such portion to be made, depending upon the particular office for which the call is intended.

39. In a telephone system employing register senders each including a plurality of digit registers and a sender, large capacity switches responsive to the control of said register senders, each of said large capacity switches having a plurality of sets of wipers, and means in said register senders whereby the digit register on which one of the digits is stored controls wiper selection in a plurality of the switches employed in a given connection, and whereby the registers on which other digits are stored control the sending portion of the register senders to retransmit impulses to control the directed operations of the large capacity switches.

40. In a telephone exchange system a first office, other offices, a sender at said first office having registers for registering the office code and numerical designations of wanted lines for controlling selector mechanism, selector mechanism operable in accordance with the office code designation of a wanted line for extending a connection to either of said other offices, and selector mechanism individual to each of said other offices and selector mechanism common to said other offices operable in accordance with the numerical designation of a wanted line for completing a connection to a wanted line in either of said other offices.

41. In a telephone exchange system, a first office, other offices, a sender at said first office having registers for registering the office code and numerical designations of wanted lines for controlling selector mechanism, selector mechanism operable in accordance with the office code designation of a wanted line for extending a connection to either of said other offices, and selector mechanism individual to each of said other offices and selector mechanism common to said other offices operable in accordance with the numerical designation of a wanted line for completing a connection to a wanted line in either of said other offices, said common selector mechanism being also operable in accordance with said code designation.

42. In a telephone exchange system, a first office, other offices, a trunk line for connecting said first office to any of said other offices, a sender at said first office having registers for registering the office code and numerical designations of wanted lines for controlling selector mechanism, selector mechanism operable in accordance with the office code designation of a wanted line in any of said other offices to extend a connection over said trunk line, and selector mechanism in dividual to each of said other offices, and selector mechanism common to said other offices operable in acccordane with the numerical designation of a wanted line for completing a connection to a wanted line in any of said offices.

43. In a telephone exchange system, a first office, other offices, a sender at said first office having registers for registering the office and numerical designations of wanted lines for controlling selector mechanism, selector mechanism operable in accordance with the office code designation of a wanted line for extending a connection to any of said other offices, selector mechanism individual to each of said other offices and selector mechanism common to said other offices operable in accordance with the numerical designation of a wanted line for completing a connection to a wanted line in any of said other offices, and means for controlling said common selector mechanism in accordance with the office code designation of a wanted line to select the selector mechanism which is individual to the desired line.

44. In a telephone exchange system, a first office, other offices, a sender at said first office having registers for registering the office and numerical designations of wanted lines for controlling selector mechanism, selector mechanism operable in accordance with the office code designation of a wanted line for extending a connection to any of said other offices, an incoming selector common to said other offices, final selectors individual to each of said other offices, said incoming selectors having access to final selectors in all of said other offices, and means controlled by said sender jointly in accordance with the office and numerical designation of a wanted line to extend said connection to a wanted line in any of said offices.

45. In a telephone exchange system, a first office, other offices, a sender at said first office having registers for registering the office code and numerical designations of wanted lines for controlling selector mechanism, selector mechanism operable in accordance with the office code designation of a wanted line for extending a connection to either of said other offices, selector mechanism individual to said other offices and selector mechanism common to said other offices operable in accordance with the numerical designation of a wanted line for completing a connection to a wanted line in either of said other offices, and means in said sender operable in accordance with the registered office code to determine whether said last selector mechanism shall extend a connection to selector mechanism in one or another of said other offices.

46. In a multi-office telephone exchange system wherein subscribers' numbers in any office are duplicated in all other offices, but are distinguished by an office-designating prefix, a register sender in one office having registers for registering the office-designation and the line-designation of a wanted line, and having sending apparatus controlled by the registering apparatus to send out office-selecting digits and to send out line-selecting digits to control selector switches to extend a connection to the called office and to control selector switches to further extend the connection to the wanted line, and a selector common to two offices and operable partly in response to one of said office-selecting digits and partly in response to one of said line-selecting digits.

47. In a multi-office telephone system; a register sender arranged to register office and line designations, to translate the office designation into office selecting digits, and to send out the translated office digits and the registered line-selecting digits; switching apparatus controlled by the digits sent out by the register sender to extend a connection to a called office and thence to a called line therein; and a selector included in said switching apparatus and responsive to an office-selecting digit and to a line-selecting digit.

48. In a multi-office telephone system, the lines in each office being divided into groups, a selector having access to a plurality of groups of lines in each of two offices, a register sender in a third office arranged to record office designations and line designations and to retransmit digit impulses corresponding to the registered designations, switching apparatus responsive to digit impulses sent out by said register sender to extend a connection from the third office to said selector, said selector being responsive to further digit impulses from said register sender to select one of said two offices, and responsive to still further digit impulses sent out by said register sender to select a group of lines in the selected office.

49. In a multi-office telephone system, a register sender arranged to register office-designating digits and line-designating digits and to retransmit translated office-code digits and line-designating digits, switching apparatus responsive to the office code digits transmitted by said register sender to extend a connection to the office whose designation is registered and to further extend the connection to the line of said office corresponding to the registered line designation, and a selector included in said switching apparatus arranged to respond to an office-code digit to make an office selection and to respond again to a line-selecting digit to extend the connection toward the called line.

50. In a multi-office telephone system wherein a subscriber's number consists of an office designation and a line designation and wherein translating register senders receive the office and line designations of wanted subscribers and control switching apparatus to set up desired connections, a group of offices located at the same place, and an automatic switch in said office group arranged to be operated partly in accordance with the office designation of a desired line and partly in accordance with the line designation.

51. In a telephone system, a first office, two other offices, a sender at the first office having registers for registering the office and numerical designations of wanted lines for controlling selector mechanism, selector mechanism operable in accordance with the office designation of a wanted line for extending a connection to said other offices, selectors common to both of said other offices, selectors individual to each of said other offices, and means responsive to the control exercised by said register sender in the first office for extending a connection to a wanted line in either of said other offices by way of the said common selector and one of said individual selectors, said common selector being controlled jointly in accordance with the office and numerical designations of the wanted line, said individual selector being controlled in accordance with the numerical designation only of the wanted line.

52. In a telephone system wherein selectors are used in setting up connections from calling lines to called lines, trunk lines divided into groups and sub-groups, a selector having access to said groups and sub-groups, means for operating said selector in accordance with a digit not forming part of a called number to select a group of said trunk lines, means for then operating said selector in accordance with a digit forming part of the called number to select a sub-group of trunk lines in the selected group, and means including a register sender for inserting the digit used to operate said selector in its group-selecting operation.

53. In a multi-office telephone system, serially related automatic switches including selectors and a final connector for extending connections to called subscribers' lines, said connector having access to two groups of subcribers' lines in two offices, respectively, and means for operating said switches to extend a connection to a subscriber's line in either office at will.

54. In a multi-office telephone system, two offices, an automatic switch, and means for operating said switch to select and complete connections to subscribers' lines in both offices.

55. In a multi-office telephone system, two offices housed under the same roof, and automatic switches each having direct access to subscribers' lines in both offices.

56. In a multi-office telephone system, a switch common to two offices and having two operating magnets, means for operating the first magnet to select a group of subscribers' lines in each office, and means for operating the second magnet to make a selection between offices and to select any subscriber's line in the selected group in the selected office.

57. In a multi-office automatic telephone system two offices, groups of connectors in each office, each group having access to a different hundreds group of subscribers' lines, and a hundreds selector having access to all said connectors.

58. In a multi-office automatic telephone system, a hundreds selector common to two offices, means for operating said selector to select either one of the two offices, and means for operating said selector to make a hundreds selection in the selected office.

59. In a multi-office automatic telephone system, means including a thousands selector and a hundreds selector for completing connections to telephone lines, said hundreds selector having access to a thousands group in each of two offices.

60. In an automatic telephone system, a thousands selector, a hundreds selector, means for operating the thousands selector in response to either of two thousands digits to extend a connection to said hundreds selector, means for operating the hundreds selector in accordance with a digit having a value depending upon the digit used to operate the thousands selector to complete the thousands selection, and means for operating the hundreds selector in response to a hundreds digit to make a hundreds selection.

61. In an automatic telephone system, a hundreds selector having two sets of wipers, a thousands selector operable in accordance with either of two thousands digits to extend a connection to said hundreds selector, means for then deriving a wiper-selecting digit from the thousands digit and for transmitting it to the hundreds selector, and means in the hundreds selector for selecting wipers in accordance with the value of the derived digit.

62. In a multi-office telephone system wherein subscribers' numbers consist, respectively, of an office name, followed by a four-digit line designation consisting of a thousands, a hundreds, a tens, and a units digit; automatic switching apparatus operable in accordance with digits corresponding to office names for extending connections to called offices; two offices located at the same place and having different office names; thousands selectors, hundreds selectors, and connectors located in and common to said offices; means for operating a thousands selector and a hundreds selector in said offices in accordance with called thousands and hundreds digits to extend a connection to a connector in such offices; and means for operating the selected connector in accordance with the name of the desired office and for operating it in accordance with the tens and units digits in the called number to complete the connection to the desired line in either desired office.

63. In a multi-office automatic telephone system, an office group including two offices installed at the same point, thousands selectors and hundreds selectors in said group common to said two offices, connector groups individual to each office, said hundreds selectors having two sets of wipers specific to said two offices, respectively, means for operating the thousands selector in the office group to extend a connection to a hundreds selector in said group, means for operating said selector to select a wiper set depending upon the office desired and for operating it in accordance with the hundreds digit in the called number to extend a connection to a connector in the desired office, said connectors each having two sets of wipers, and means for operating the seized connector in accordance with the thousands digit to select wipers and for operating it in accordance with the tens and units digits to connect with the called line through the selected set of wipers.

64. In an automatic telephone system, a hundreds selector having two sets of wipers, a thousands selector operable in accordance with either of two digits to extend connections to said hundreds selector by way of the same set of bank contacts, and means for selecting a set of wipers at said hundreds selector depending upon the digit used to operate the thousands selector.

65. In a multi-office automatic telephone system, two 10,000-line offices located at the same place and having different office designations, thousands selectors common to both offices, means for extending connections to said thousands selectors in response to either office designation, hundreds selectors common to both of said offices accessible to said thousands selectors, said thousands selectors being operable in response to a thousands digit to extend connections to said hundreds selector, each of said hundreds selectors having two sets of wipers, means for selecting a set of wipers at a seized hundreds selector depending upon the value of the digit to which the thousands selector responded to seize the hundreds selector, final connectors common to said two offices and having two sets of wipers specific to said two offices, respectively, means for operating a seized hundreds selector to extend a connection through the selected set of wipers to a connector, and means for operating the seized connector to select one office or the other by selecting a wiper set depending upon the office designation used to extend the instant connection to the thousands selector in use, and for operating said connector in response to tens and units digits to complete the connection to the called line in the called office through the selected set of wipers.

66. In a multi-office automatic telephone system wherein numbers include an office designation and a line designation, a thousands selector common to two offices, a register sender operable to register and retransmit a thousands digit, and means in said register sender for causing said thousands selector to choose between offices by translating the thousands digit in a way depending upon the office to be chosen.

67. In a telephone system comprising a plurality of intercommunicating telephone exchanges having selector switches of different kinds and lines grouped in accordance with different numeral systems, control mechanisms at one of said exchanges, circuits under the control of said mechanisms for controlling the extension of the talking connection, means for setting said control mechanisms in accordance with the subscriber's number wanted, and means associated with said control mechanisms for varying said circuits, when the connection is extended to another exchange, so as to adapt the control mechanisms for the numerical system of the other exchange.

68. In a telephone system, a plurality of telephone exchanges of different characters, a register sender in one of said exchanges including registering devices and a sender arranged to operate under the control of said registering devices, means for setting said registering devices in accordance with desired telephone numbers, circuits interconnecting said registering devices with said sender, means for operating said sender and for controlling it through said interconnecting circuits to retransmit digits of the registered telephone number, and means controlled in accordance with the setting of one of said registers for adapting the circuits interconnecting the registers with the sender in accordance with the character of the exchange in which the line having the called number terminates.

69. In a telephone system, exchanges of different characters, register senders in one of said exchanges, each of said register senders including a group of registers and a sender arranged to be controlled in accordance with the setting of the registers, means effective when a call is made from a line terminating in the said one exchange for taking one of said register senders for use, means for setting up the digits of the number of the desired line on the registers of the selected register sender, means controlled in accordance with the setting of said registers and depending upon the exchange in which the called line terminates for effecting an association between the registers and said sender which depends upon the character of the called exchange, and means for operating said sender in accordance with the setting of said registers and in accordance with the character of the called exchange to retransmit the registered telephone number.

70. In a telephone system including a plurality of automatic telephone exchanges of different characters; a register sender in one of said exchanges including registering apparatus arranged to register digits of a called number in any one of said exchanges and a sender operable to retransmit the registered digits; it being necessary for said sender to respond differently to a given setting of certain ones of said registers, depending upon the character of the called exchange; and means controlled in accordance with the setting of the portion of the registers indicating the called exchange for adapting the sender to respond to the register setting in a manner dependent upon the character of the called exchange.

71. In an automatic telephone exchange system, a first automatic exchange having lines grouped in accordance with one numeral system, a second automatic exchange having lines grouped in accordance with a different numeral system, register senders in a random one of the exchanges of the system arranged to register and retransmit digits of desired telephone numbers, automatic switches responsive to the retransmitted digits to extend a connection from a calling line in said random exchange to the first exchange or to the second exchange, automatic switches in the called exchange arranged to extend the connection to the called line responsive to further retransmitted digits, and means associated with said register sender for adapting the register sender to retransmit registered digits in accordance with the numeral system used in the grouping of the lines of the particular called exchange.

72. In an automatic telephone system, an exchange wherein the lines are grouped in accordance with the straight decimal system, another exchange wherein the lines are grouped in accordance with a system differing from the straight decimal system, a third exchange wherein the lines are grouped in a third way, a register sender arranged to register the numbers of lines of all of said exchanges and to control the switches in any one of said exchanges, and means associated with said register sender for adapting it to control the switches in any one of said exchanges in accordance with the particular grouping of the lines of such exchange.

In witness whereof, I hereunto subscribe my name this 13th day of June, A. D. 1930.

MICHAEL SCHWARTZ.